United States Patent
Yun et al.

(10) Patent No.: US 10,550,992 B2
(45) Date of Patent: Feb. 4, 2020

(54) VEHICLE OR BIKE MOUNT FOR ELECTRONIC DEVICES

(71) Applicant: SPIGEN KOREA CO., LTD., Seoul (KR)

(72) Inventors: Sun Woo Yun, Seoul (KR); Bum Joon Lee, Seoul (KR); Deok Hyun Ahn, Seoul (KR); Jae Hong Cho, Seoul (KR); Namheui Jung, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 16/198,641

(22) Filed: Nov. 21, 2018

(65) Prior Publication Data

US 2019/0154190 A1     May 23, 2019

Related U.S. Application Data

(60) Provisional application No. 62/589,486, filed on Nov. 21, 2017, provisional application No. 62/615,335, filed on Jan. 9, 2018.

(51) Int. Cl.
| F16M 11/00 | (2006.01) |
| F16M 11/04 | (2006.01) |

(Continued)

(52) U.S. Cl.
CPC ....... *F16M 11/041* (2013.01); *B60R 11/0241* (2013.01); *B60R 11/0252* (2013.01);
(Continued)

(58) Field of Classification Search
CPC ............... F16M 11/041; F16M 11/08; F16M 2200/024; F16M 2200/068;
(Continued)

(56) References Cited

U.S. PATENT DOCUMENTS 5,114,060 A  *  5/1992  Boyer ................... B62J 7/06
                                                  224/413
6,484,913 B1 * 11/2002  Hancock ................ B60R 7/14
                                                  211/64

(Continued)

OTHER PUBLICATIONS

"Quad Lock Smartphone Mount Overview", https://www.youtube.com/watch?v=gcSFN35lRlo, published on Dec. 22, 2013.
(Continued)

*Primary Examiner* — Peter N Helvey
(74) *Attorney, Agent, or Firm* — Heedong Chae; Lucem, PC

(57) ABSTRACT

An apparatus for mounting an electronic device includes a case for the electronic device; an attachment portion, formed on the case, having a groove; and a mount constructed to be attachable to a bicycle or a vehicle. The mount includes a locking cap having a protrusion; a rotatable cap having a tab groove wherein the rotatable cap is rotatable with respect to the locking cap; a biased switch having a tab wherein the tab is biased toward the rotatable cap. Here, the tab groove includes an opening and a groove is broadly defined to include an opening. The mount is attachable to the attachment portion by inserting the protrusion of the locking cap into the groove of the attachment portion and rotating the attachment portion or the locking cap with respect to each other.

28 Claims, 19 Drawing Sheets

(51) Int. Cl.
 B60R 11/02 (2006.01)
 F16M 11/08 (2006.01)
 B60R 11/00 (2006.01)
(52) U.S. Cl.
 CPC ...... F16M 11/08 (2013.01); *B60R 2011/0073* (2013.01); *B60R 2011/0075* (2013.01); *F16M 2200/024* (2013.01); *F16M 2200/068* (2013.01); *F16M 2200/08* (2013.01)
(58) Field of Classification Search
 CPC ............ F16M 2200/08; B60R 11/0241; B60R 11/0252; B60R 2011/0073; B60R 2011/0075
 USPC ........................................................ 224/553
 See application file for complete search history.

(56) References Cited

U.S. PATENT DOCUMENTS

| | | | | |
|---|---|---|---|---|
| 8,132,700 B2* | 3/2012 | Dacko | ...................... | B62J 11/00 224/420 |
| 8,261,954 B2* | 9/2012 | Lee | ...................... | B60R 11/0258 224/282 |
| 8,366,064 B2* | 2/2013 | Chen | ...................... | F16M 11/043 224/416 |
| 8,602,277 B2* | 12/2013 | Lee | ...................... | B60R 11/0258 224/282 |
| 8,613,379 B2* | 12/2013 | Lee | ...................... | B62J 11/00 224/282 |
| 8,627,990 B2* | 1/2014 | Nakajima | ................ | B62J 9/008 224/420 |
| 8,708,151 B2 | 4/2014 | Whitten | | |
| 8,830,663 B2 | 9/2014 | Child | | |
| 8,998,048 B1* | 4/2015 | Wu | ......................... | B62J 11/00 224/420 |
| 9,120,432 B2* | 9/2015 | Fan | ......................... | B60R 11/02 |
| 9,243,739 B2 | 1/2016 | Peters | | |
| 2003/0042283 A1* | 3/2003 | Carnevali | ................ | B60R 7/14 224/560 |
| 2011/0255219 A1 | 10/2011 | Ou | | |
| 2012/0050968 A1 | 3/2012 | Child | | |
| 2013/0318775 A1 | 12/2013 | Peters | | |
| 2015/0282343 A1* | 10/2015 | Downes | ..................... | F16B 2/18 224/420 |

OTHER PUBLICATIONS

"Quad Lock iPhone Bike Mount", https://www.youtube.com/watch?v=5nVBVwDxZpA, published on Dec. 8, 2014.
"Quad Lock—Out Front Mount for iPhone and GoPro", https://www.youtube.com/watch?v=6hgGOytnkas, published on Sep. 21, 2015.
"Quad Lock Motorcycle and Scooter Mounts for Samsung Galaxy", https://www.youtube.com/watch?v=u7Wtdr3_tl4, published on Jul. 26, 2017.
"Quad Lock Bike Mount 2017", https://www.youtube.com/watch?v=d7aLCdXjXRc, published on Sep. 6, 2017.
"Quad Lock Motorcycle and Scooter Mounts 2017", https://www.youtube.com/watch?v=cg1C4QKD7Ql, published on Sep. 11, 2017.
"Quad Lock How To—Universal Car Mount Kit", https://www.youtube.com/watch?v=7EwgRYwvnVs, published on Oct. 5, 2017.
"Quad Lock—Motorcycle & Scooter Smartphone Mount 2018", https://www.youtube.com/watch?v=LnePzqcM0BY, published on Oct. 8, 2017.
"Quad Lock—Smartphone Bike Mount 2018", https://www.youtube.com/watch?v=lKepsLzl3QY, published on Oct. 8, 2017.
"Quad Lock How To—Motorcycle Mount", https://www.youtube.com/watch?v=8Vm83nWAFgU, published on Oct. 11, 2017.

* cited by examiner

30

40

VEHICLE OR BIKE MOUNT FOR ELECTRONIC DEVICES

CROSS-REFERENCE TO RELATED APPLICATIONS

This application claims priority to U.S. provisional patent application No. 62/615,335, filed on Jan. 9, 2018, and priority to U.S. provisional patent application No. 62/589,486, filed on Nov. 21, 2017, the disclosures of which are incorporated herein by reference in their entirety.

FIELD OF THE INVENTION

The present invention relates to a bike mount or car mount for a portable electronic device, and more specifically, an apparatus for securely mounting an electronic device to a bicycle or a vehicle, comprised of a case having an attachment means and a mount having a locking cap, a rotatable cap, and a biased switch.

BACKGROUND OF THE INVENTION

Bike mounts or car mounts for electronic devices such as a smart phone, cell phone, tablet computing device, PDA, digital audio players, etc are popular accessories for consumers on the go. For such mounts, consumer needs for easy attachment and removal of such electronic devices exist to the mount and secure attachment of the electronic device without being dislodged from the mount. However, obtaining these two objectives are not easy because they counteract with each other and/or there may be a trade off in obtaining the two objectives. If attachment and removal properties are easy and convenient, the mount may not securely hold the electronic device. On the contrary, if a mount securely holds an electronic device, the mount may have a complex structure that may lead to the attachment and removal of the mount being inconvenient.

The present invention is directed to overcome such disadvantages and effectively achieve the two objectives.

SUMMARY OF THE INVENTION

The present invention is directed to an apparatus for securely mounting an electronic device to a bicycle or a vehicle, comprised of a case having an attachment means and a mount having a locking cap, a rotatable cap, and a biased switch.

The object of the present invention is to provide an apparatus for mounting an electronic device, comprising: a case for the electronic device; an attachment portion, formed on the case or fixedly attached to the case, having a groove; and a mount constructed to be removably attachable to a vehicle or a bicycle. The mount includes a locking cap having a protrusion; a rotatable cap having a tab groove wherein the rotatable cap is rotatable with respect to the locking cap; a biased switch having a first tab wherein the first tab is biased towards the rotatable cap. Here, the tab groove includes an opening (a groove is broadly defined to include an opening). The mount is removably attachable to the attachment portion by inserting the protrusion of the locking cap into the groove of the attachment portion and rotating the attachment portion or the locking cap with respect to each other.

Another object of the present invention is to provide an apparatus for mounting an electronic device, comprising: an attachment portion, attachable to the electronic device, having a groove; and a mount constructed to be attachable to a bicycle or a vehicle. The mount 20 comprises a locking cap 30 having a protrusion; a rotatable cap having a tab groove wherein the rotatable cap is rotatable with respect to the locking cap; a biased switch comprising a first tab wherein the first tab is biased toward the rotatable cap. The mount is removably attachable to the attachment portion by inserting the protrusion of the locking cap into the groove of the attachment portion and rotating the attachment portion or the locking cap with respect to each other.

Yet another object of the present invention is to provide a mount for use along with an attachment portion to form an apparatus for mounting an electronic device wherein the attachment portion is attachable to the electronic device and has a groove and the mount is constructed to removably attachable to a vehicle or a bicycle, the mount 20 comprising: a locking cap having a protrusion; a rotatable cap having a tab groove wherein the rotatable cap is rotatable with respect to the locking cap; and a biased switch comprising a first tab wherein the first tab is biased toward the rotatable cap, wherein the mount is removably attachable to the attachment portion by inserting the protrusion of the locking cap into the groove of the attachment portion and rotating the attachment portion or the locking cap with respect to each other, wherein while rotating the attachment portion or the locking cap with respect to each other, the rotatable cap rotates together with the attachment portion with respect to the locking cap, thereby allowing the first tab of the biased switch to be released into the tab groove of the rotatable cap in order to prevent further rotation of the rotatable cap and prevent removal of the locking cap from the attachment portion.

The advantages of the present invention are: (1) it is very easy and convenient to attach and detach a portable electronic device to and from the apparatus of the present invention; (2) the apparatus of the present invention securely holds an electronic device; (3) the apparatus of the present invention protects the electronic device from vibrations and potential impact forces associated with operating a vehicle or a bicycle, and (4) the apparatus of the present invention has a durable structure and even if it comprises several elements, they are easy to manufacture and assemble.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment. "Groove" includes any cut, depression, or channel, or opening. "Rib" includes any protruding element from a surface, this protruding element can take any number of structural forms including, but not limited to, protruding bead, protruding longitudinal structure, protruding elongated structure, protruding polygonal structure, producing circular structure, protruding elliptical structural, or any of the like.

Figure 1:
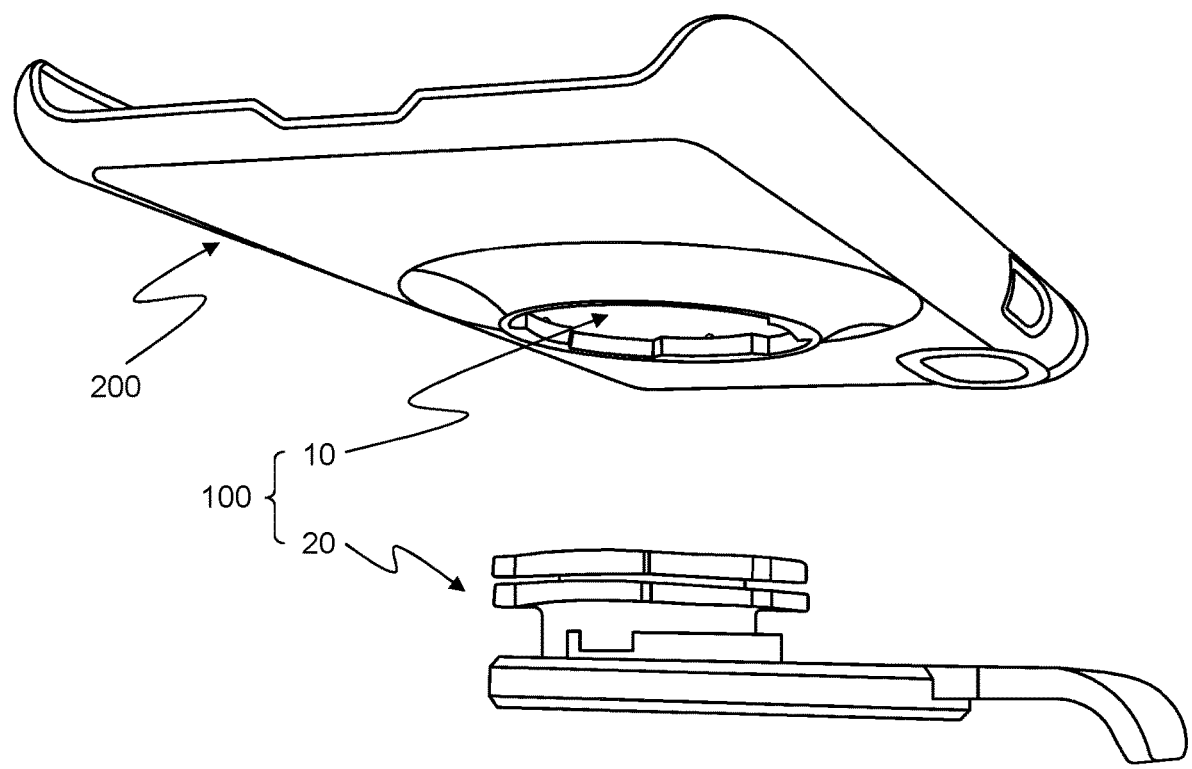
FIG. 1 shows the apparatus of the present invention, comprised of an attachment portion formed on the back of a case for an electronic device and a mount.

FIG. 1 shows the apparatus 100, comprised of an attachment portion 10 and a mount 20. The attachment portion 10 may be formed on a back of a case 200 for an electronic device, or alternatively, the attachment portion 10 may be constructed independently to be fixedly attachable to a back of a case 200 or directly to an electronic device.

Figure 2:
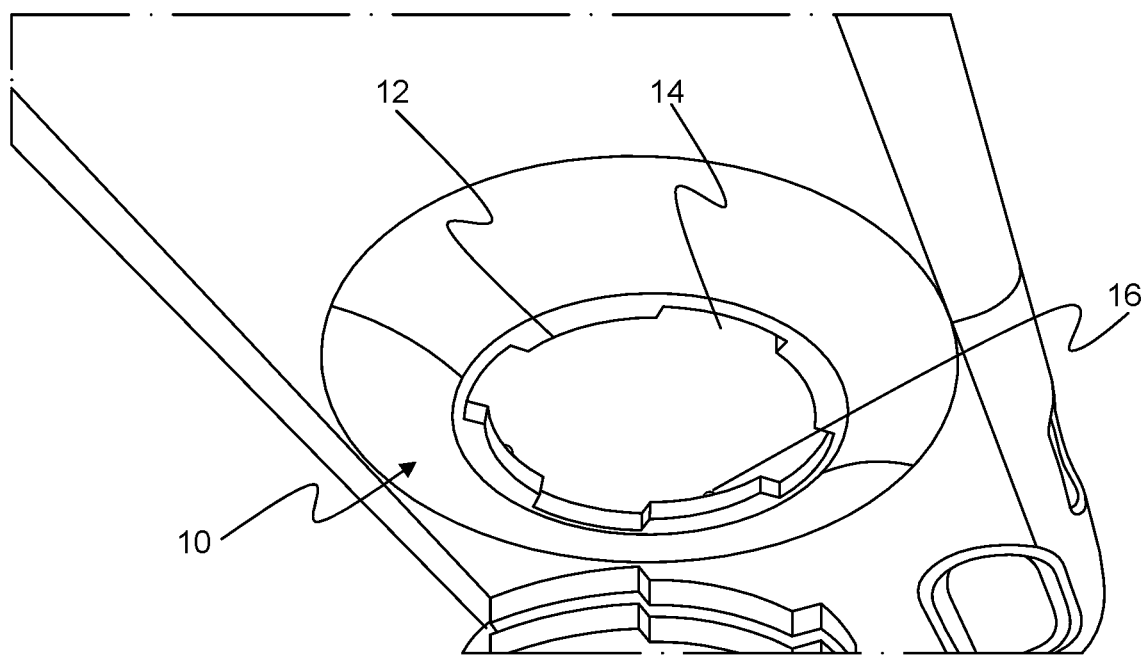
FIG. 2 shows another view of the attachment portion having protrusions and grooves and a cavity below the protrusions and grooves.
Figure 3:
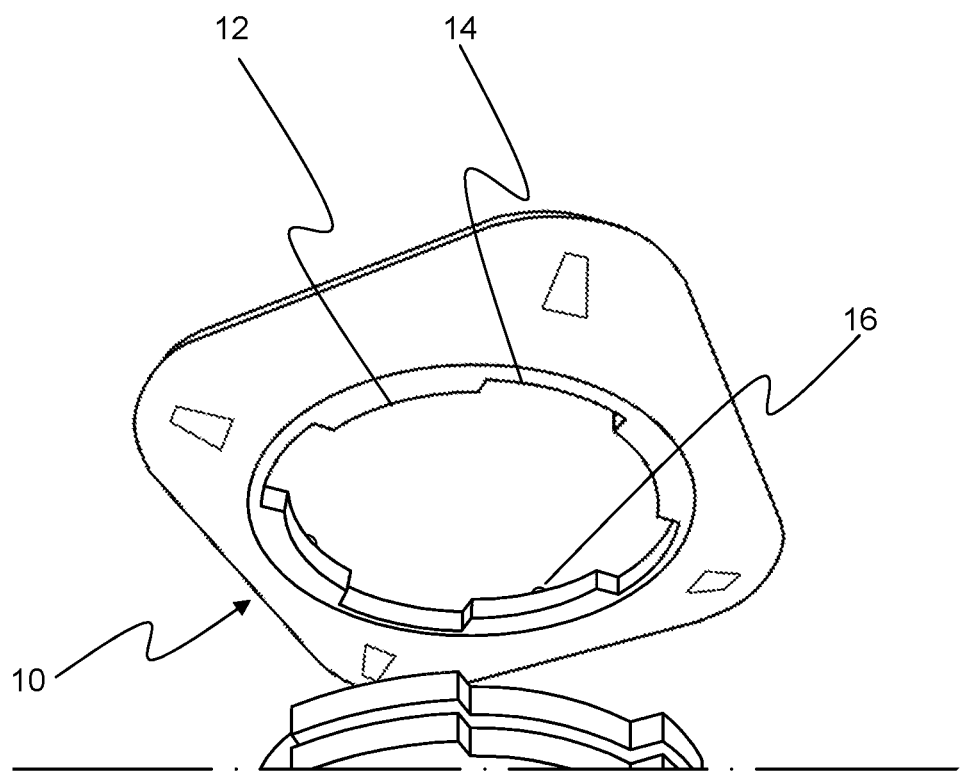
FIG. 3 shows a perspective view of an independently-constructed attachment portion that can be fixably attachable to a back of a case or attached to an electronic device.

FIGS. 2-3 show the attachment portion 10. As shown in FIG. 2, the attachment portion 10 may be formed on a back of a case 200 for an electronic device. Alternatively, as shown in FIG. 3, the attachment portion 10 may be constructed independently to be fixedly attachable to a back of a case 200 or directly to an electronic device. The attachment portion 10 includes alternately disposed protrusions 12 and grooves 14, and there is a hollow cavity below the protrusions 12 and the grooves 14.

Figure 4:
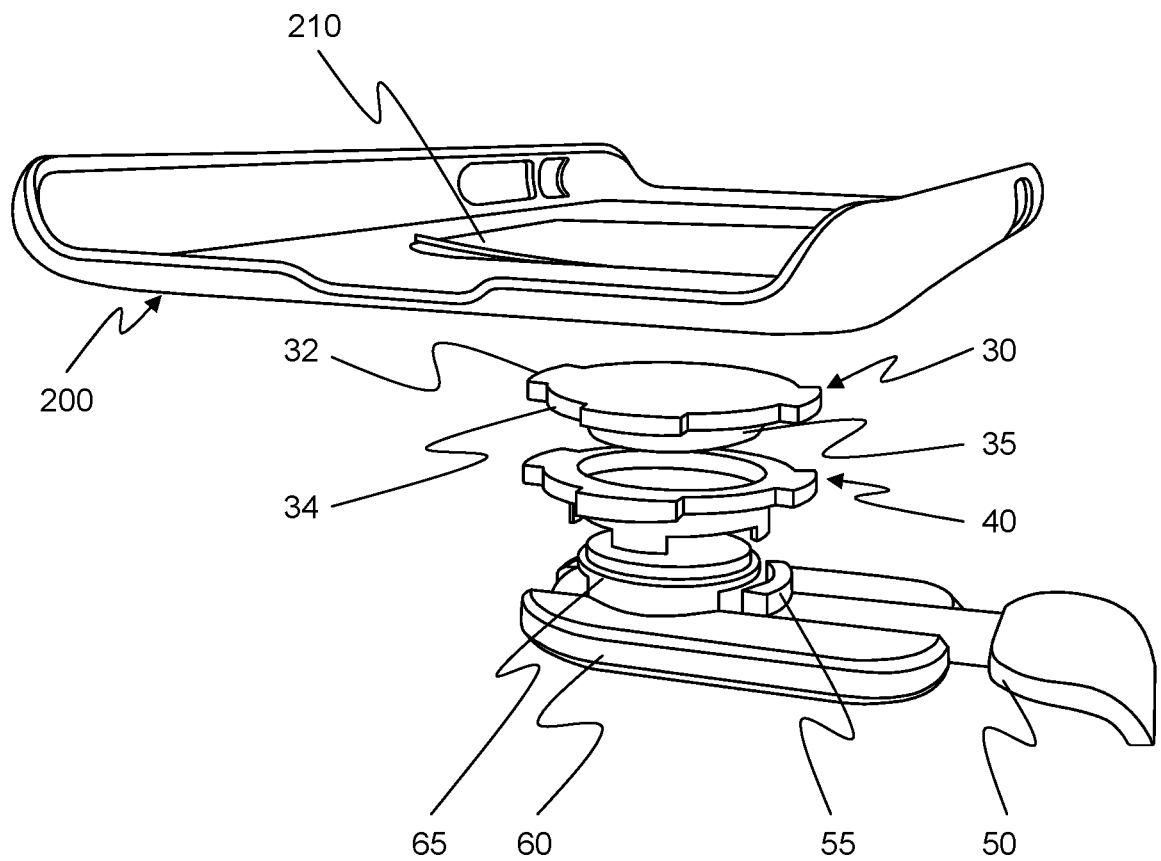
FIG. 4 shows exploded view of the mount, having a locking cap, a rotatable cap, and a biased switch.

FIG. 4 shows an exploded view of the mount 20 with respect to the case 200 having an attachment portion 10.

Figure 15:
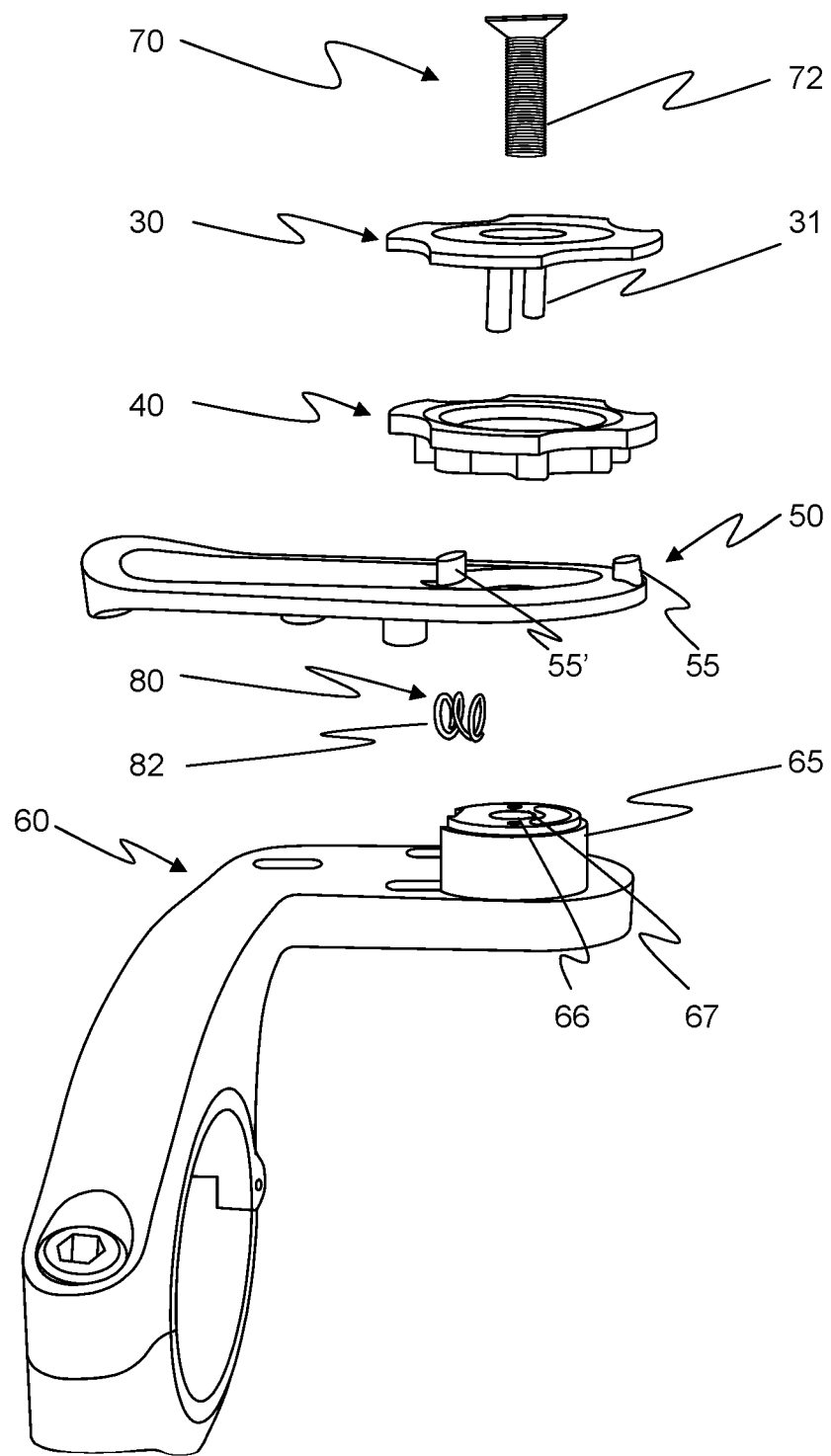
FIG. 15 shows an exploded view of still another embodiment.
Figure 16:
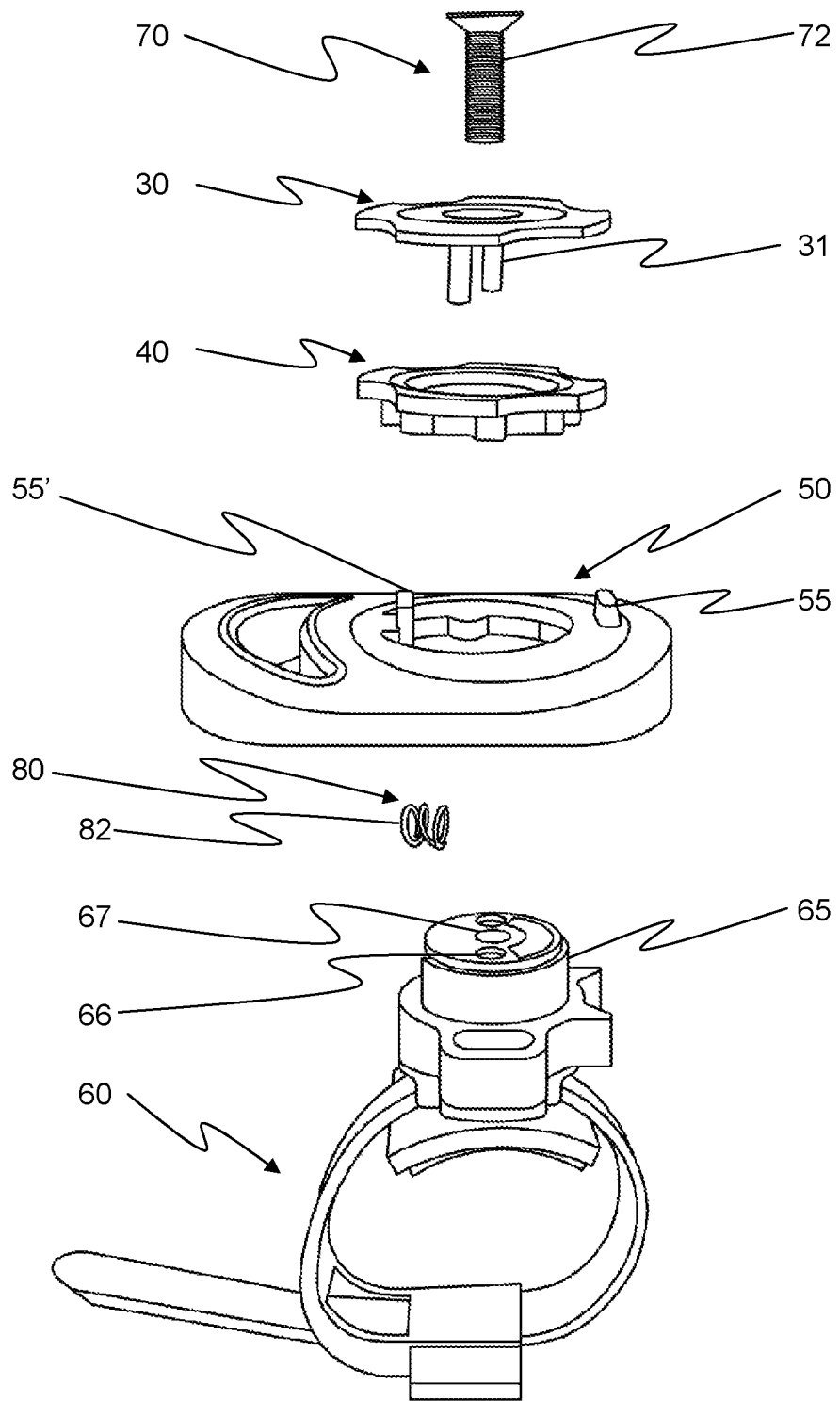
FIG. 16 shows an exploded view of still another embodiment.
Figure 17A:
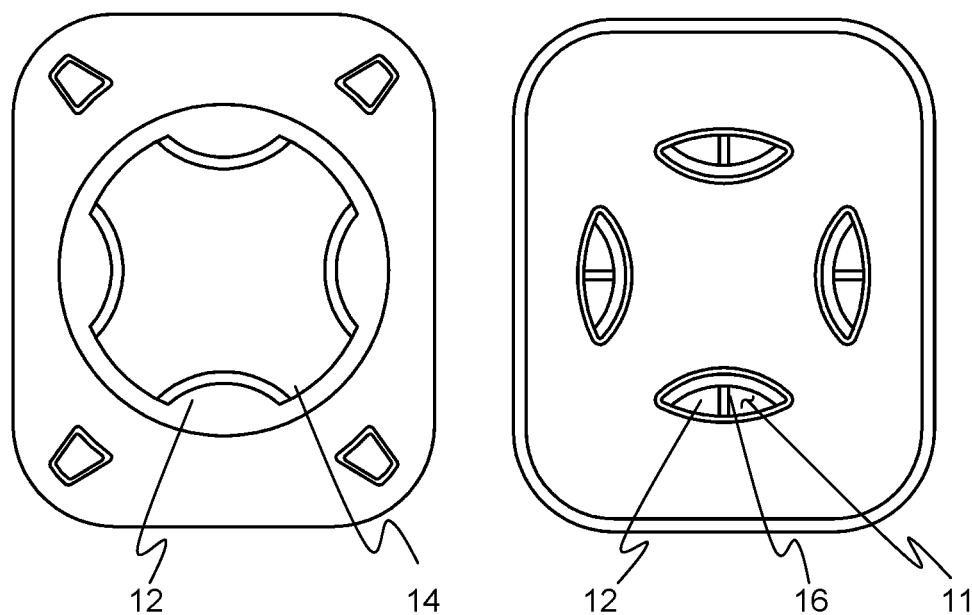
FIG. 17A shows top and bottom views of the attachment portion.
Figure 17B:
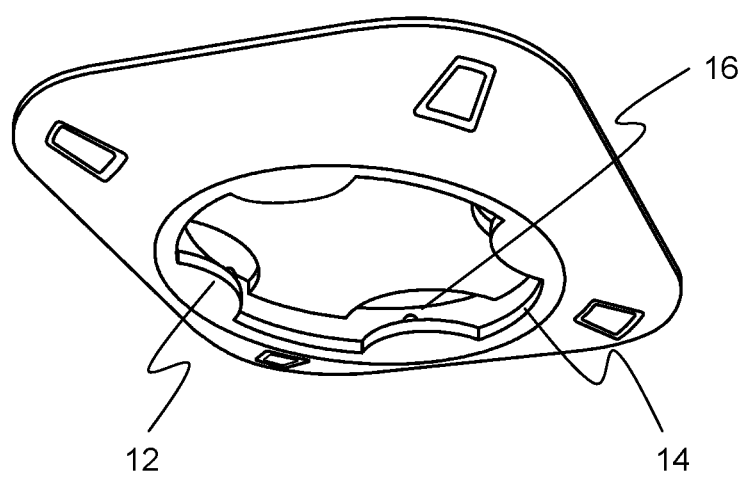
FIG. 17B shows a perspective view of the attachment portion.
Figure 18A:
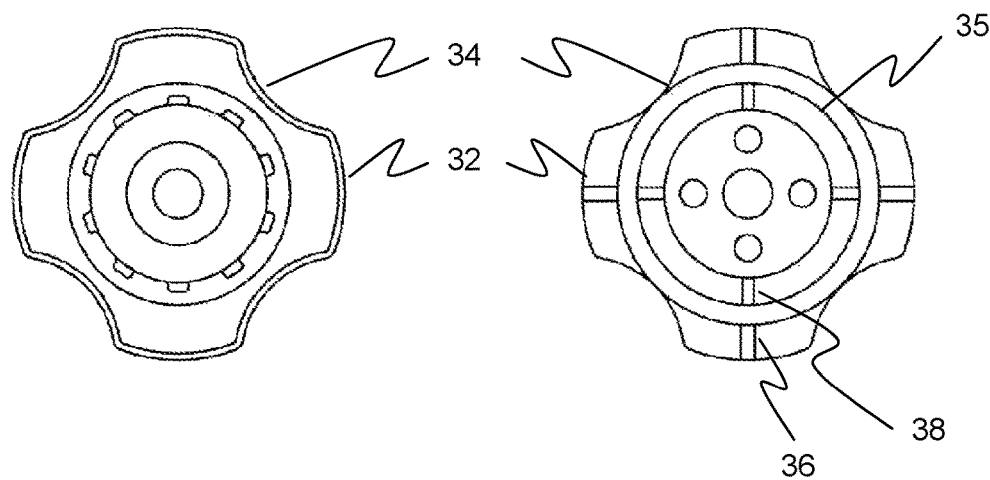
FIG. 18A shows top and bottom views of the locking cap.
Figure 18B:
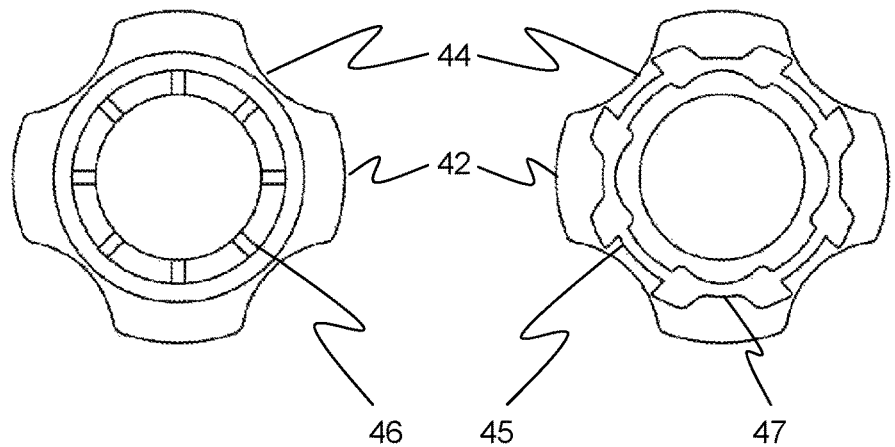
FIG. 18B shows top and bottom views of the rotatable cap.
Figure 19:
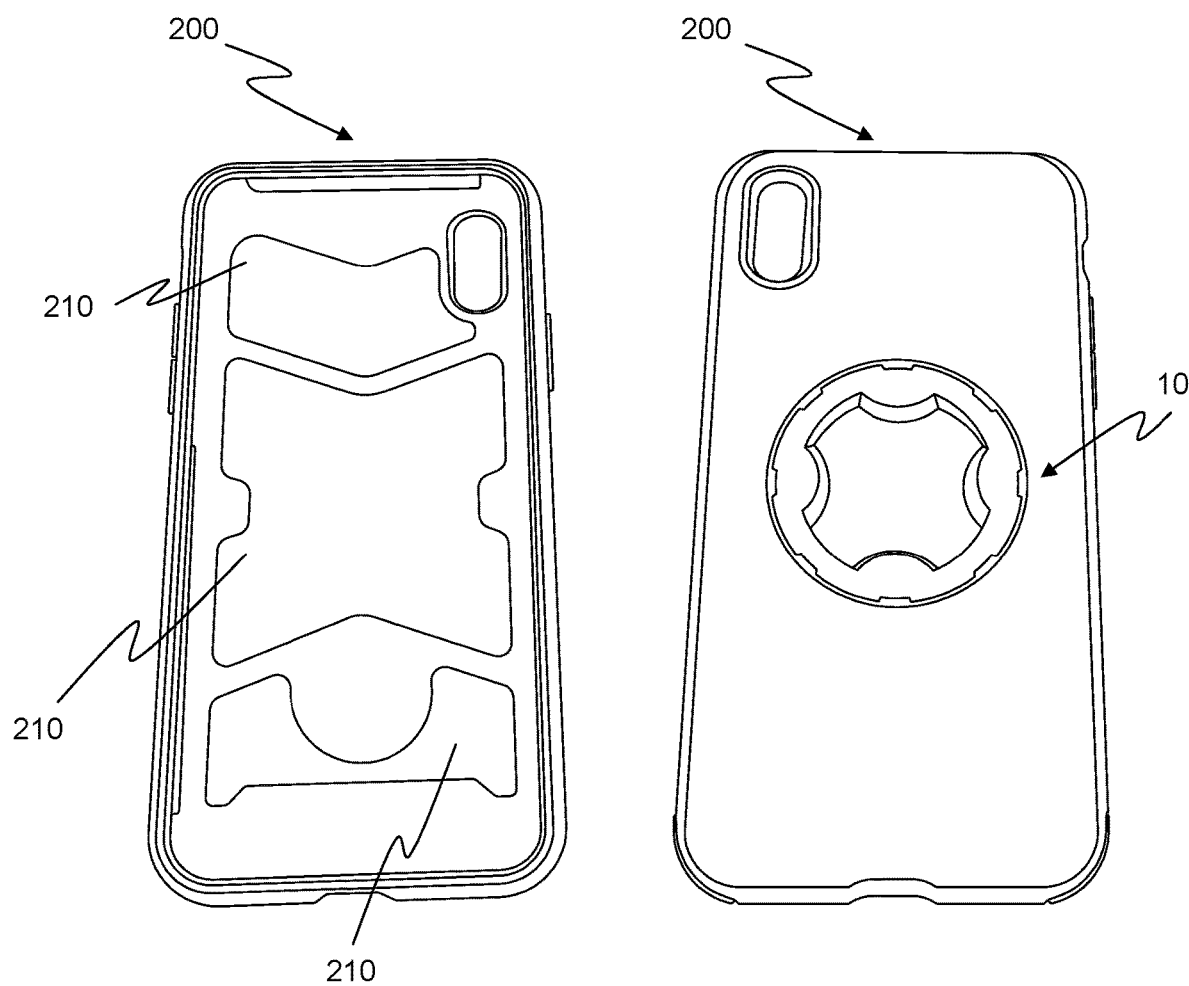
FIG. 19 shows two perspective views of a case with the attachment portion.
Figure 20:
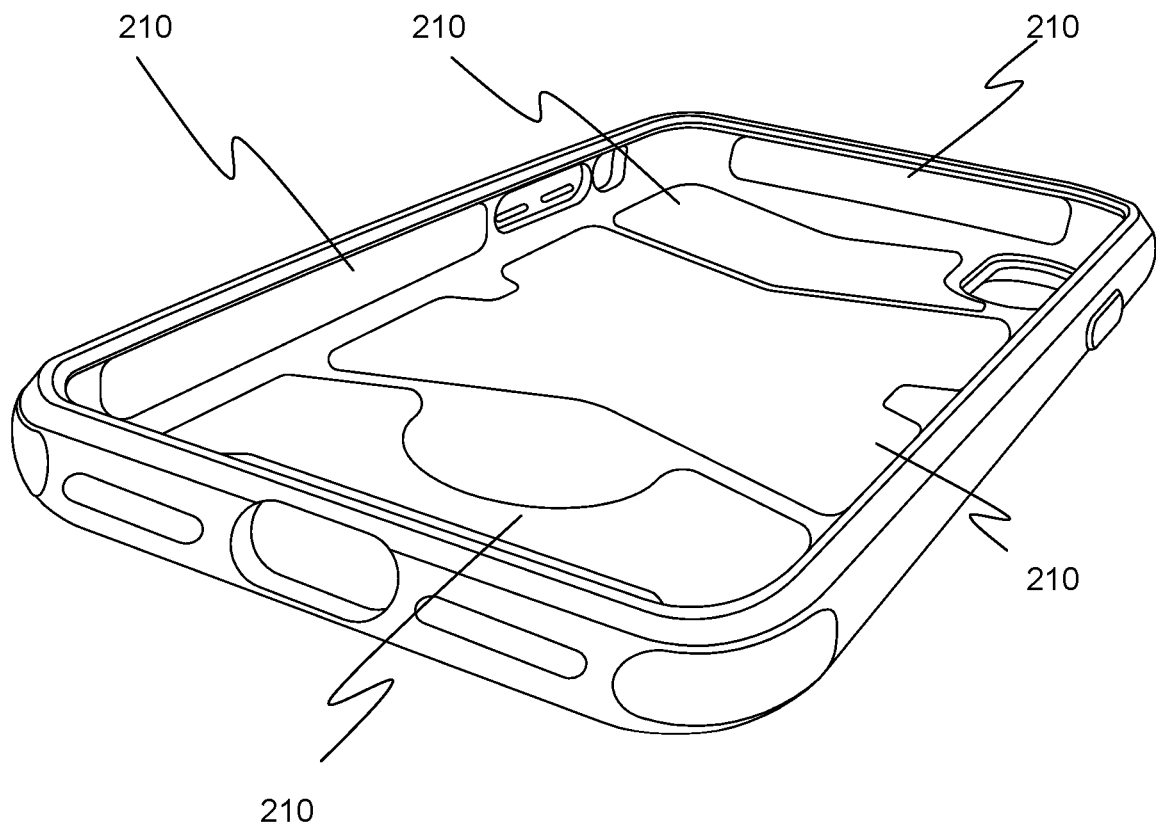
FIG. 20 shows a perspective view of a case.

The apparatus of the present invention, for mounting an electronic device, comprises: a case 200 for the electronic device; an attachment portion 10, formed on the case 200, having a groove 14; and a mount 20 constructed to be attachable to a bicycle or a vehicle. Various means for attaching the mount to a bicycle or vehicle are already well known in the art, examples of which are shown in FIGS. 15 and 16. As shown in FIGS. 4, 19 and 20, the case 200 may include a foam padding 210 fixed to an inside surface thereof to provide additional protection to the electronic device such as shock and/or vibration attenuation. The foam padding 210 may be fixed to a location on the inside surface that is opposite to the location of attachment portion 10 and/or the foam padding may be fixed to the inner sides of the case 200. The foam padding can be fixed to different portions of the case using any method known in the art, which includes (but is not limited to) tapes (double-sided, heat-resistant, permanent mounting tape, etc.), applied-on adhesives, acrylic-based adhesives, curing agents, fasteners, velcro and the like.

The mount 20 comprises: a locking cap 30 having a protrusion 32; a rotatable cap 40 having a tab groove 45 wherein the rotatable cap 40 is rotatable with respect to the locking cap 30; a biased switch 50 having a first tab 55. The first tab 55 is biased toward the rotatable cap 40, and thus, it can be released into the tab groove 45 of the rotatable cap 40. The mount 20 is attachable to the attachment portion 10 by inserting the protrusion 32 of the locking cap 30 into the groove 14 of the attachment portion 10 and rotating the attachment portion 10 or the locking cap 30 with respect to each other. More precisely, the protrusion 32 of the locking cap 30 passes the groove 14 of the attachment portion 10 and rests in the hollow cavity of the attachment portion 10, and then, the locking cap 30 rotates within the hollow cavity of the attachment portion 10 until the protrusion 32 of the locking cap 30 is at least partially aligned with the protrusion 12 of the attachment portion 10 in order to prevent the locking cap 30 from being dislodged from the attachment portion 10.

After the protrusion 32 of the locking cap 30 is inserted into the groove 14 of the attachment portion 10 and passes the groove 14 to rest in the cavity of the attachment portion 10, the protrusion 42 of the rotatable cap 40 is received in the groove 14 of the attachment portion 10. Since the protrusion 42 of the rotatable cap 40 is received or fits in the groove 14 of the attachment portion 10, when rotating the attachment portion 10 or the locking cap 30 with respect to each other, the rotatable cap 40 rotates together with the attachment portion 10 with respect to the locking cap 30, thereby allowing the tab 55 of the biased switch 50 to be released into the tab groove 45 of the rotatable cap 40 in order to prevent rotation of the rotatable cap 40 and removal of the locking cap 30 from the attachment portion 10. The biased switch 50 is biased toward the rotatable cap 40 by a spring or any other means known in the art.

Figure 5:
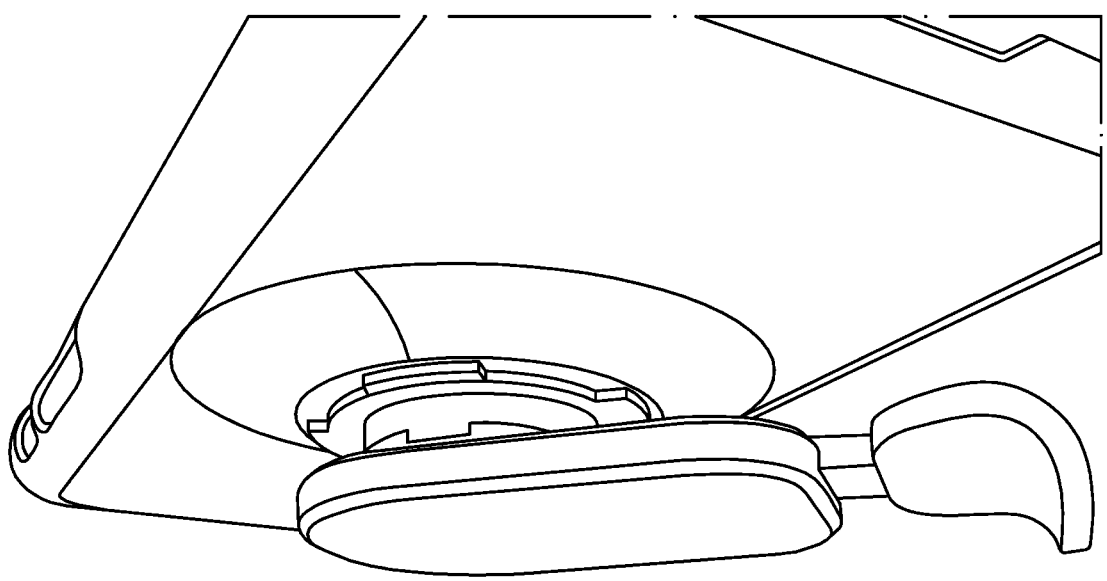
FIG. 5 shows the locking cap and the rotatable cap being inserted into the grooves of the attachment portion.

For attaching and detaching the attachment portion 10 to or from the mount 20, the protrusions 32 of the locking cap 30 are aligned with the protrusions 42 of the rotatable cap 40, and then, those protrusions 32, 42 are aligned with the grooves 14 of the attachment portion 10 to be received therein. In FIG. 5, the protrusions 32 of the locking cap 30 are inserted into the grooves 14 of the attachment portion 10, pass the grooves 14, and rest in the cavity of the attachment portion 10 whereas the protrusions 42 of the rotatable cap 40 is received in the grooves 14 of the attachment portion 10. Since the protrusions 42 of the rotatable cap 40 is stuck in the grooves 14 of the attachment portion 10, the rotatable cap 40 rotates together with the attachment portion 10 until the first tab 55 of the biased switch 50 is released into the tab groove 45 of the rotatable cap 40 in order to prevent further rotation of the rotatable cap 40 as in FIG. 5. Since the rotatable cap 40 cannot rotate, the locking cap 30 is locked to the attachment portion 10 and cannot be removed or dislodged from the attachment portion 10. The attachment portion 10 can be rotated clockwise or counter-clockwise.

The mount 20 may further comprise a base 60 which is fixedly attached to the locking cap 30. The locking cap 30 can be fixedly attached to the locking cap 30 by male/female thread coupling, by a bolt, or by bolt/nut coupling, or by any other means known in the art. The rotatable cap 40 is rotatable with respect to the locking cap 30 and the base 60, and the base 60 is constructed to be attachable to a bicycle or a vehicle.

As shown in FIG. 4, the mount 20 may further comprise a cylindrical guide 35, 65 which extends from the locking cap 30 or the base 60 or both, and the rotatable cap 40 is rotatable with respect to the cylindrical guide 35, 65 as well as the locking cap 30 and the base 60. In other words, the rotatable cap 40 is constructed in a shape of a cylindrical sleeve and the cylindrical guide 35, 65 fits in the rotatable cap 40. The cylindrical guide 35, 65 may be hollow, partially hollow or solid.

In one embodiment, the attachment portion 10 has a plurality of protrusions 12 and the plurality of grooves 14 wherein the protrusions 12 and the grooves 14 are alternately disposed, and the locking cap 30 has the plurality of protrusions 32 and the plurality of grooves 34 wherein the protrusions 32 and the grooves 34 are alternately disposed. Furthermore, the rotatable cap 40 has the plurality of protrusions 42 and the plurality of grooves 44 wherein the protrusions 42 and the grooves 44 are alternately disposed.

The mount 20 is removably attachable to the attachment portion 10 via insertion of the protrusions 32 of the locking cap 30 and the protrusions 42 of the rotatable cap 40 into the grooves 14 of the attachment portion 10 and rotation of the attachment portion 10 or the locking cap 30 with respect to each other, and wherein after the insertion, the protrusions 32 of the locking cap 30 are rotatable within the protrusions 12 of the attachment portion 10 whereas the protrusions 42 of the rotatable cap 40 is prevented from rotation by the protrusions 12 of the attachment portion 10. Additionally, the rotatable cap 40 comprises the plurality of tab grooves 45 and the plurality of beveled grooves 47, wherein the tab grooves 45 and the beveled grooves 47 are formed and alternately disposed on an outer-circumferential surface of the rotatable cap 40. Before the insertion, the tab grooves 45 of the rotatable cap 40 are aligned with the grooves 34 of the locking cap 30 whereas after the rotation, the tab grooves 45 of the rotatable cap 40 are aligned with the protrusions 32 of the locking cap 30.

Furthermore, the tab grooves 45 have a depth constructed to receive the first tab 55 of the biased switch 50 and to prevent further rotation of the rotatable cap, and wherein the beveled grooves 47 comprise sloped edges and a depth to receive the first tab 55 of the biased switch 50 and to allow the first tab 55 of the biased switch 50 to move out of the beveled grooves 47 during rotation of the rotatable cap 40. The depth of the tab grooves 45 can be greater than the depth of the beveled grooves 47 to receive the first tab 55 to prevent further rotation of the rotatable cap 40. Alternatively, the depth of the tab grooves 45 may be substantially similar or the same to that of the depth of the beveled groove 47.

In one embodiment, the attachment portion 10 has four protrusions 12 and four grooves 14 wherein the protrusions 12 and the grooves 14 are alternately disposed, and the locking cap 30 has four protrusions 32 and four grooves 34 wherein the protrusions 32 and the grooves 34 are alternately disposed. Furthermore, the rotatable cap 40 has four protrusions 42 and four grooves 44 wherein the protrusions 42 and the grooves 44 are alternately disposed.

In alternative embodiments, the number of arcuate protrusions or grooves can be two, six or eight or more.

The mount 20 is attachable to the attachment portion 10 by inserting the protrusions 32 of the locking cap 30 and the protrusions 42 of the rotatable cap 40 into the grooves 14 of the attachment portion 10 and rotating the attachment portion 10 or the locking cap 30 with respect to each other. After the inserting, the protrusions 32 of the locking cap 30 passes the grooves 14 of the attachment portion 10 and the locking cap 30 is rotatable within the attachment portion 10 whereas the protrusions 42 of the rotatable cap 40 fits in the grooves 14 of the attachment portion 10 and the protrusions 12 of the attachment portion prevents rotation of the rotatable cap 40.

Before the inserting, the tab grooves 45 of the rotatable cap 40 are aligned with the grooves 34 of the locking cap 30 whereas after the rotating, the tab grooves 45 of the rotatable cap 40 are aligned with the protrusions 32 of the locking cap 30.

Figure 6:
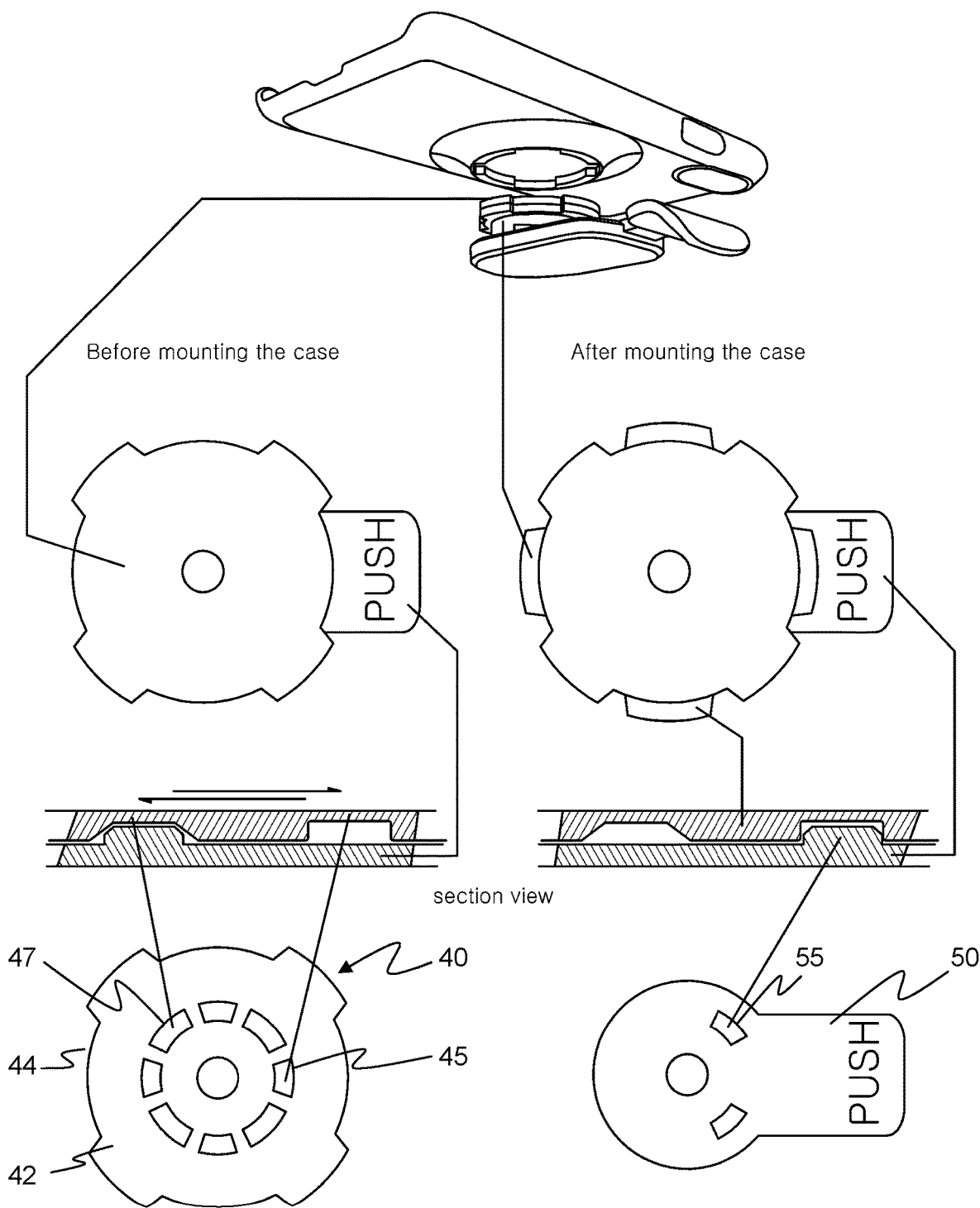
FIGS. 6-7 show alternative embodiments of the biased switch and the tab grooves of the rotatable cap.
Figure 7:
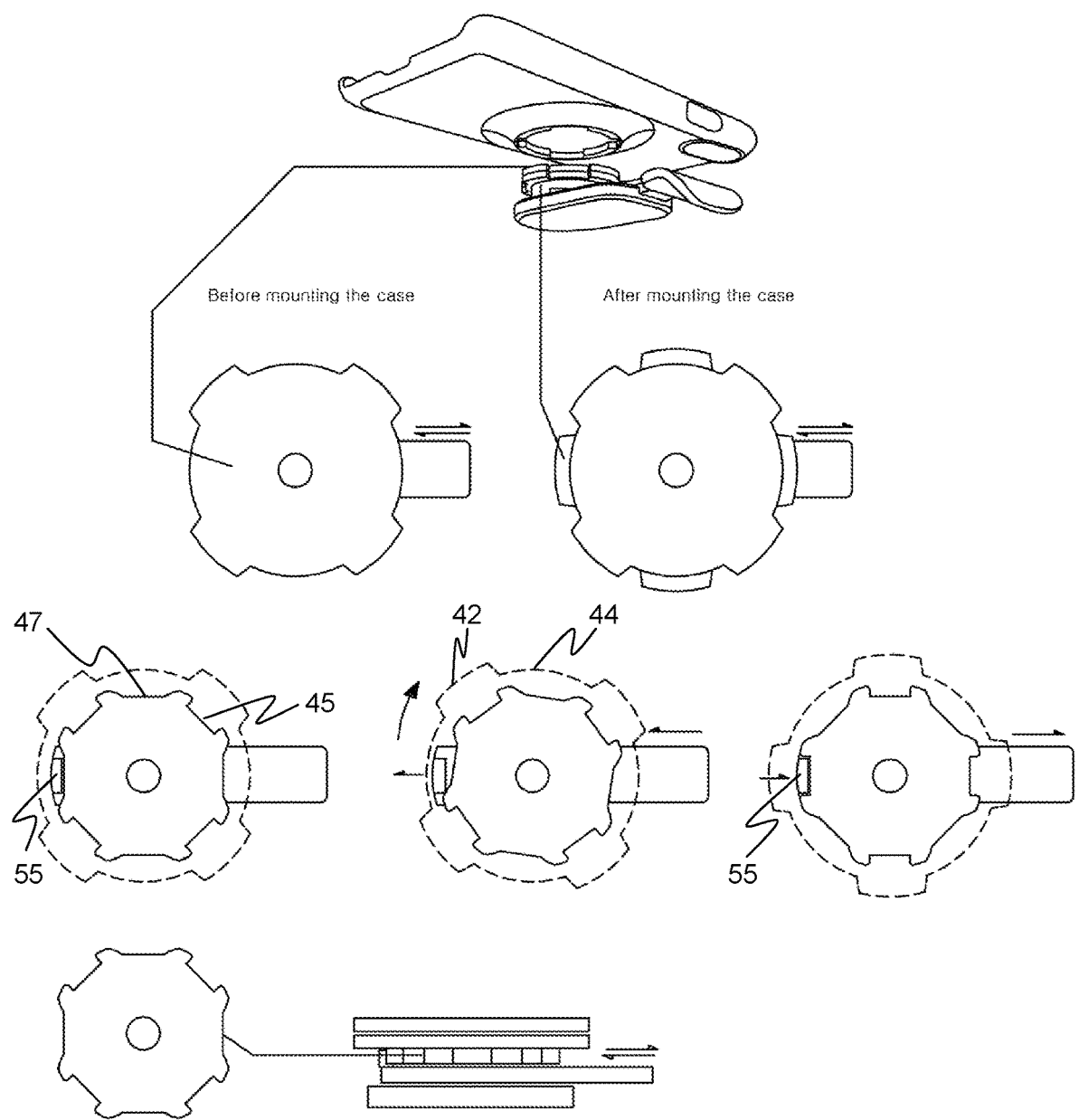

FIGS. 6 and 7 show alternative embodiments of the biased switch 50 and the tab grooves 45 of the rotatable cap 40. FIG. 6 shows one embodiment and FIG. 7 shows another embodiment of the biased switch.

As in FIG. 6, tab grooves 45 are formed on the bottom of the rotatable cap 40, and the tab 55 of the biased switch 50 is biased toward the rotatable cap 40 and constructed to be received in the tab groove 45 to prevent rotation of the rotatable cap 40. Furthermore, beveled grooves 47 are formed on the bottom of the rotatable cap 40 wherein the tab grooves 45 and the beveled grooves 47 are alternately disposed in a circle as in FIG. 6. Rotation of the rotatable cap 40 pushes the tab 55 of the biased switch 50 in the beveled groove 47 away from the rotatable cap 40 and then, the tab 55 is released into the tab groove 45 to prevent further rotation of the rotatable cap 40. The tab 55 may be pushed out of the tab groove 45 and the rotatable cap 40 may be rotated in order to allow the tab 55 to be released into the beveled groove 47.

Alternatively, the biased switch 50 may be a lever resting on a pivot and the pivot has a spring to bias the tab 55 toward the rotatable cap 40. The pivot or hinge is spring-loaded to bias the switch 50 toward the rotatable cap 40.

As in FIG. 7, tab grooves 45 and beveled grooves 47 may be alternately disposed on an outer-circumferential surface of the rotatable cap 40. The tab 55 of the biased switch 50 is biased toward the rotatable cap 40 and constructed to be received in the tab groove 45 to prevent rotation of the rotatable cap 40. Rotation of the rotatable cap 40 pushes the tab 55 of the biased switch 50 in the beveled groove 47 away from the rotatable cap 40 and then, the tab 55 is released into the tab groove 45 to prevent further rotation of the rotatable cap 40. The tab 55 may be pushed out of the tab groove 45 and the rotatable cap 40 may be rotated in order to allow the tab 55 to be released into the beveled groove 47.

In an alternative embodiment, the attachment portion 10 can be manufactured as an independent element to be attachable to a case 200 or an electronic device. The apparatus 100 for mounting an electronic device comprises: an attachment portion 10, fixedly attachable to a case 200 for an electronic device or to the electronic device, having a groove 14; and a mount 20 constructed to be attachable to a bicycle or a vehicle. The mount 20 comprises: a locking cap 30 having a protrusion 32; a rotatable cap 40 having a tab groove 45 wherein the rotatable cap 40 is rotatable with respect to the locking cap 30; a biased switch 50 having a tab 55 wherein the tab 55 is biased toward the rotatable cap 40. The mount 20 is attachable to the attachment portion 10 by inserting the protrusion 32 of the locking cap 30 into the groove 14 of the attachment portion 10 and rotating the attachment portion 10 or the locking cap 30 with respect to each other.

While rotating the attachment portion 10 or the locking cap 30 with respect to each other, the rotatable cap 40 rotates together with the attachment portion 10 with respect to the locking cap 30, thereby allowing the tab 55 of the biased switch 50 to be released into the tab groove 45 of the rotatable cap 40 in order to prevent rotation of the rotatable cap 40 and removal of the locking cap 30 from the attachment portion 10.

The mount 20 may further comprise a base 60 which is fixedly attached to the locking cap 30, and the rotatable cap 40 is rotatable with respect to the locking cap 30 and the base 60. In addition, the base 60 is constructed to be attachable to a bicycle or a vehicle.

The mount 20 may further comprise a cylindrical guide 35, 65 which extends from the locking cap 30 or the base 60 or both, and the rotatable cap 40 is rotatable with respect to the cylindrical guide 35, 65 as well as the locking cap 30 and the base 60.

The attachment portion 10 has a plurality of protrusions 12 and the plurality of grooves 14 wherein the protrusions 12 and the grooves 14 are alternately disposed, and the locking cap 30 has the plurality of protrusions 32 and the plurality of grooves 34 wherein the protrusions 32 and the grooves 34 are alternately disposed. In addition, the rotatable cap 40 has the plurality of protrusions 42 and the plurality of grooves 44 wherein the protrusions 42 and the grooves 44 are alternately disposed.

The mount 20 is removably attachable to the attachment portion 10 via insertion of the protrusions 32 of the locking cap 30 and the protrusions 42 of the rotatable cap 40 into the grooves 14 of the attachment portion 10 and rotation of the attachment portion 10 or the locking cap 30 with respect to each other, and wherein after the insertion, the protrusions 32 of the locking cap 30 are rotatable within the protrusions 12 of the attachment portion 10 whereas the protrusions 42 of the rotatable cap 40 is prevented from rotation by the protrusions 12 of the attachment portion 10. Additionally, the rotatable cap 40 comprises the plurality of tab grooves 45 and the plurality of beveled grooves 47, wherein the tab grooves 45 and the beveled grooves 47 are formed and alternately disposed on an outer-circumferential surface of the rotatable cap 40. Before the insertion, the tab grooves 45 of the rotatable cap 40 are aligned with the grooves 34 of the locking cap 30 whereas after the rotation, the tab grooves 45 of the rotatable cap 40 are aligned with the protrusions 32 of the locking cap 30.

Furthermore, the tab grooves 45 have a depth constructed to receive the first tab 55 of the biased switch 50 and to prevent further rotation of the rotatable cap, and wherein the beveled grooves 47 comprise sloped edges and a depth to receive the first tab 55 of the biased switch 50 and to allow the first tab 55 of the biased switch 50 to move out of the beveled grooves 47 during rotation of the rotatable cap 40. The depth of the tab grooves 45 can be greater than the depth of the beveled grooves 47 to receive the first tab 55 to prevent further rotation of the rotatable cap 40. Alternatively, the depth of the tab grooves 45 may be substantially similar or the same to that of the depth of the beveled groove 47.

In one embodiment, the attachment portion 10 has four protrusions 12 and four grooves 14 wherein the protrusions 12 and the grooves 14 are alternately disposed, and the locking cap 30 has four protrusions 32 and four grooves 34 wherein the protrusions 32 and the grooves 34 are alternately disposed. In addition, the rotatable cap 40 has four protrusions 42 and four grooves 44 wherein the protrusions 42 and the grooves 44 are alternately disposed. As in the drawings, the protrusions and grooves are arcuate.

The mount 20 is attachable to the attachment portion 10 by inserting the protrusions 32 of the locking cap 30 and the protrusions 42 of the rotatable cap 40 into the grooves 14 of the attachment portion 10 and rotating the attachment portion 10 or the locking cap 30 with respect to each other.

After the inserting, the protrusions 32 of the locking cap 30 passes the grooves 14 of the attachment portion 10 and the locking cap 30 is rotatable within the attachment portion 10 whereas the protrusions 42 of the rotatable cap 40 fits in the grooves 14 of the attachment portion 10 and the protrusions 12 of the attachment portion prevents rotation of the rotatable cap 40.

Before the inserting, the tab grooves 45 of the rotatable cap 40 are aligned with the grooves 34 of the locking cap 30 whereas after the rotating, the tab grooves 45 of the rotatable cap 40 are aligned with the protrusions 32 of the locking cap 30.

In one embodiment as in FIG. 6, tab grooves 45 are formed on the bottom of the rotatable cap 40, and the tab 55 of the biased switch 50 is biased toward the rotatable cap 40 and constructed to be received in the tab groove 45 to prevent rotation of the rotatable cap 40. Furthermore, beveled grooves 47 are formed on the bottom of the rotatable cap 40 wherein the tab grooves 45 and the beveled grooves 47 are alternately disposed in a circle as in FIG. 6. Rotation of the rotatable cap 40 pushes the tab 55 of the biased switch 50 in the beveled groove 47 away from the rotatable cap 40 and then, the tab 55 is released into the tab groove 45 to prevent further rotation of the rotatable cap 40. The tab 55 may be pushed out of the tab groove 45 and the rotatable cap 40 may be rotated in order to allow the tab 55 to be released into the beveled groove 47.

In alternative embodiment, the biased switch 50 may be a lever resting on a pivot and the pivot has a spring to bias the tab 55 toward the rotatable cap 40. The pivot or hinge is spring-loaded to bias the switch 50 toward the rotatable cap 40.

In still alternative embodiment as in FIG. 7, tab grooves 45 and beveled grooves 47 may be alternately disposed on an outer-circumferential surface of the rotatable cap 40. The tab 55 of the biased switch 50 is biased toward the rotatable cap 40 and constructed to be received in the tab groove 45 to prevent rotation of the rotatable cap 40. Rotation of the rotatable cap 40 pushes the tab 55 of the biased switch 50 in the beveled groove 47 away from the rotatable cap 40 and then, the tab 55 is released into the tab groove 45 to prevent further rotation of the rotatable cap 40. The tab 55 may be pushed out of the tab groove 45 and the rotatable cap 40 may be rotated in order to allow the tab 55 to be released into the beveled groove 47.

Figure 8:
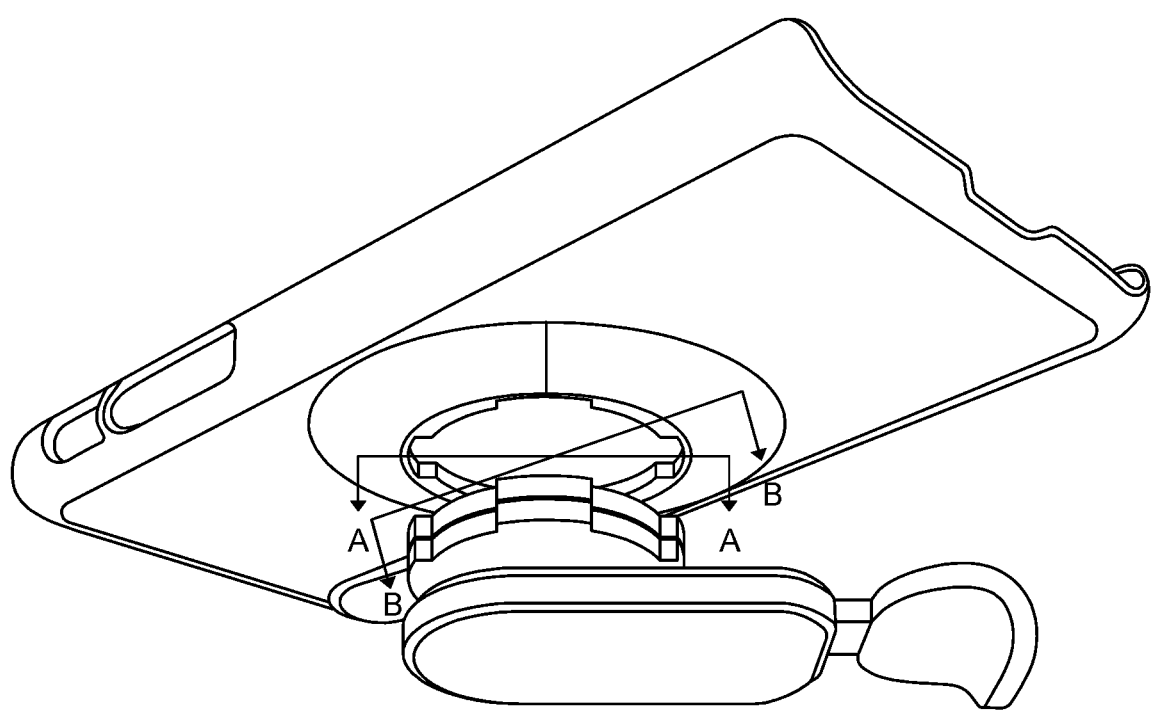
FIG. 8 shows the mount detached from the attachment portion.
Figure 8A:
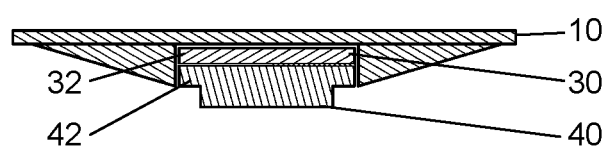
FIGS. 8A and 8B respectively show the step of inserting the locking cap and the rotatable cap into the grooves of the attachment means (respectively A-A and B-B cross sectional views) and FIG. 8C shows the step of rotating the locking cap or the attachment means with respect to each other (B-B cross sectional view)
Figure 8B:
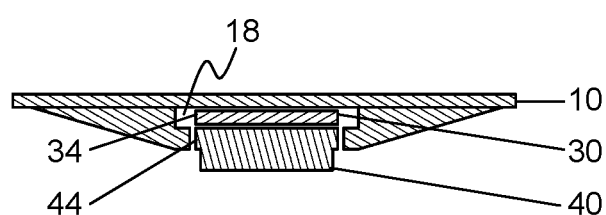
Figure 8C:
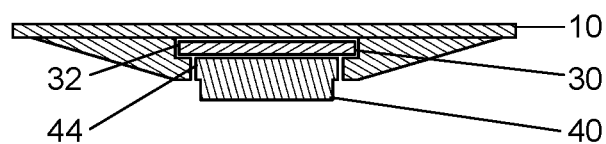

FIG. 8 shows the mount 20 detached from the attachment portion 10. FIGS. 8A and 8B respectively show the step of inserting the locking cap 30 and the rotatable cap 40 into the grooves 14 of the attachment means 10. FIGS. 8A and 8B are A-A and B-B cross sectional views of FIG. 8. FIG. 8C shows the step of rotating the locking cap 30 or the attachment portion 10 with respect to each other. FIG. 8C is the B-B cross-sectional view when the locking tab protrusions 30 are aligned with the protrusions 12 of the attachment portion 10.

FIGS. 8A and 8B show where the locking cap 30 and the rotatable cap 40 are inserted into the grooves 14 of the attachment portion 10. Thus, FIG. 8A shows the protrusions 32, 42 of the locking cap 30 and the rotatable cap 40, and FIG. 8B shows the grooves 34, 44 of the locking cap 30 and the rotatable cap 40. Here, the rotatable cap 40 fits in the protrusions 12 and grooves 14 of the attachment portion 10 and the attachment portion 10 has the space 18 where the locking cap 30 can rotate. If the attachment portion 10 is rotated with respect to the locking cap 30, the rotatable cap 40 rotates along with the attachment portion 10. Then, the protrusions 32 of the locking cap 30 are at least partially aligned with the protrusions 12 of the attachment portion 10 to prevent removal of the locking cap 30 (or the mount 20) from the attachment portion 10 (or the case 200). Once, the protrusions 32 of the locking cap 30 are completely aligned with the protrusions 12 of the attachment portion 10, the tab 55 of the biased switch 50 releases into the tab groove 45 of the rotatable cap 40 to prevent rotation of the rotatable cap 40 (or the mount 20 with respect to the attachment portion 10).

To remove the mount 20 from the attachment portion 10, the biased switch needs to be pulled or pushed to get the tab 55 out of the tab groove 45 of the rotatable cap 40 in order to make the rotatable cap 40 and the attachment portion 10 rotatable with respect to the locking cap 30. If the attachment portion 10 rotates to the point where the protrusions 32 of the locking cap 30 are aligned with the grooves 14 of the attachment portion 10 so that the locking cap 30 can be removed out of the attachment portion 10.

Figure 9:
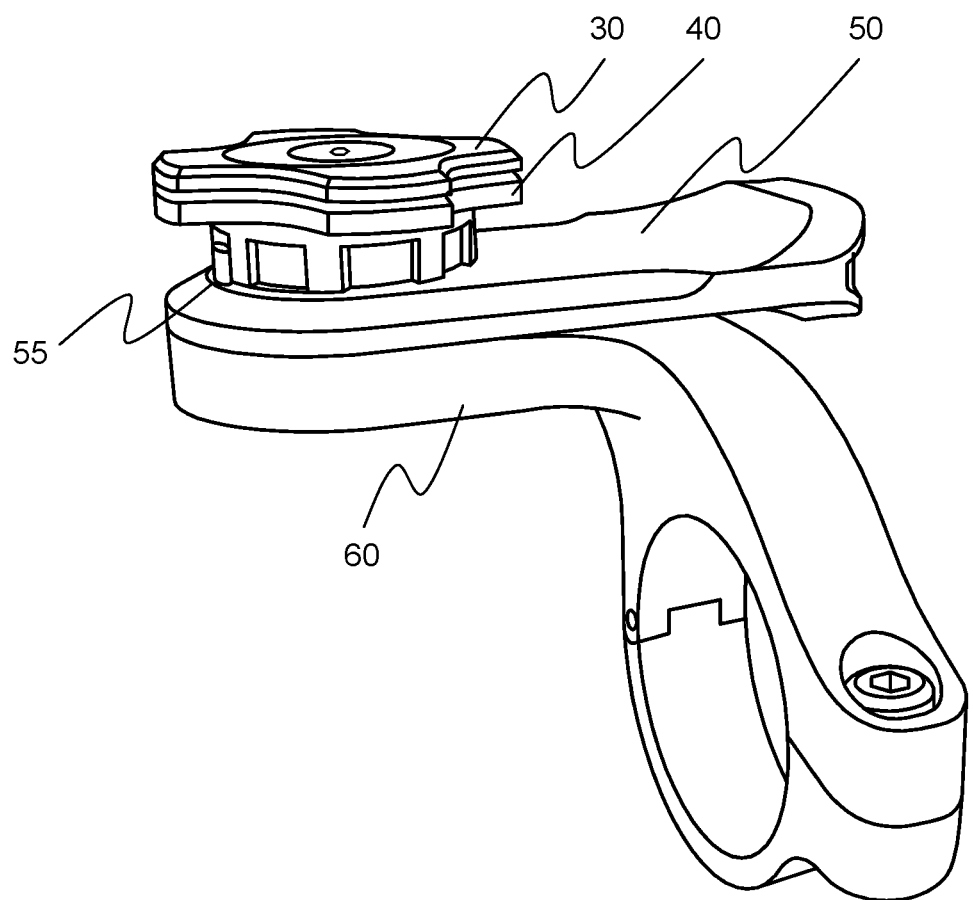
FIG. 9 shows the mount of still another embodiment of the present invention.

FIG. 9 shows the mount 20 of still another embodiment of the present invention. The apparatus for mounting an electronic device comprises a case 200 for the electronic device; an attachment portion 10, formed on the case 200 or fixedly attachable to the case 200, having a groove 14; and a mount 20 constructed to be attachable to a bicycle or a vehicle. The mount 20 comprises: a locking cap 30 having a protrusion 32; a rotatable cap 40 having a first tab groove 45 wherein the rotatable cap 40 is rotatable with respect to the locking cap 30; and a biased switch 50 having a first tab 55 wherein the first tab 55 is biased toward the rotatable cap 40. The mount 20 is attachable to the attachment portion 10 by inserting the protrusion 32 of the locking cap 30 into the groove 14 of the attachment portion 10 and rotating the attachment portion 10 or the locking cap 30 with respect to each other. While rotating the attachment portion 10 or the locking cap 30 with respect to each other, the rotatable cap 40 rotates together with the attachment portion 10 with respect to the locking cap 30, thereby allowing the first tab 55 of the biased switch 50 to be released into the first tab groove 45 of the rotatable cap 40 in order to prevent rotation of the rotatable cap 40 and removal of the locking cap 30 from the attachment portion 10.

The mount 20 further comprises a base 60 which is fixedly attached to the locking cap 30, and the rotatable cap 40 is rotatable with respect to the locking cap 30 and the base 60. The base 60 is constructed to be attachable to a bicycle or a vehicle.

The base 60 is fixedly attached to the locking cap 30 by a connecting member 70. Preferably, the connecting member 70 comprises a shaft 72, and the rotatable cap 40 is rotatable with respect to the shaft 72 as well as the locking cap 30 and the base 60. The shaft 72 may be threaded to permit the connecting member to be received in a complimentary hole that is also threaded, such as a guide hole 67 formed about the center of the cylindrical guide 65.

Figure 10A:
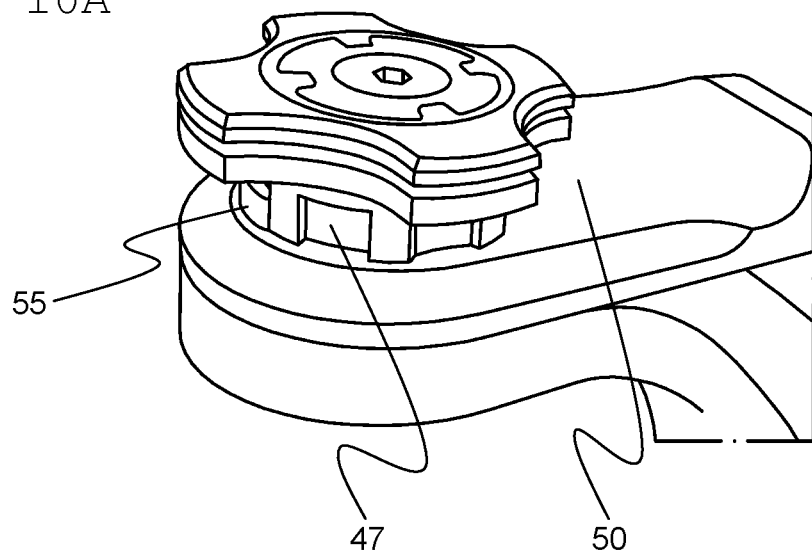
FIG. 10A show various views of the embodiment of FIG. 9 where the first tab is received in the first beveled groove and FIG. 10B shows the biased switch pushed to get the first tab out of the first tab groove.
Figure 10B:
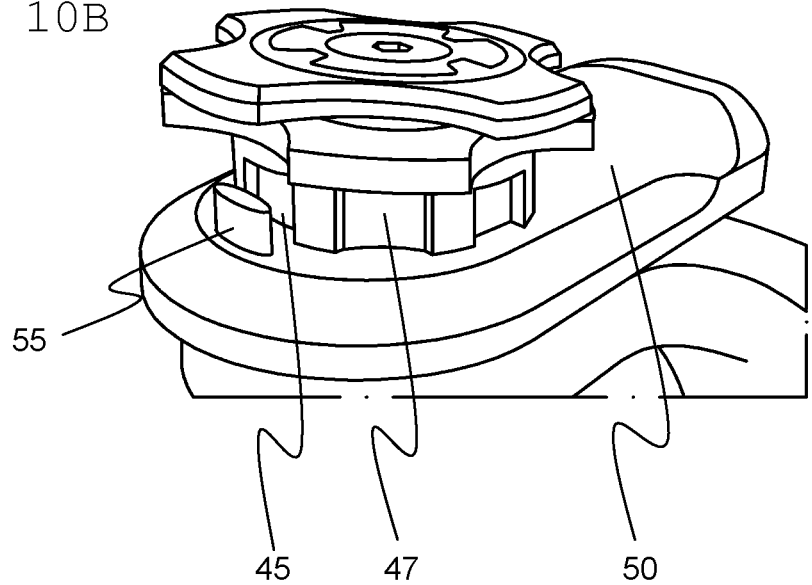
Figure 12:
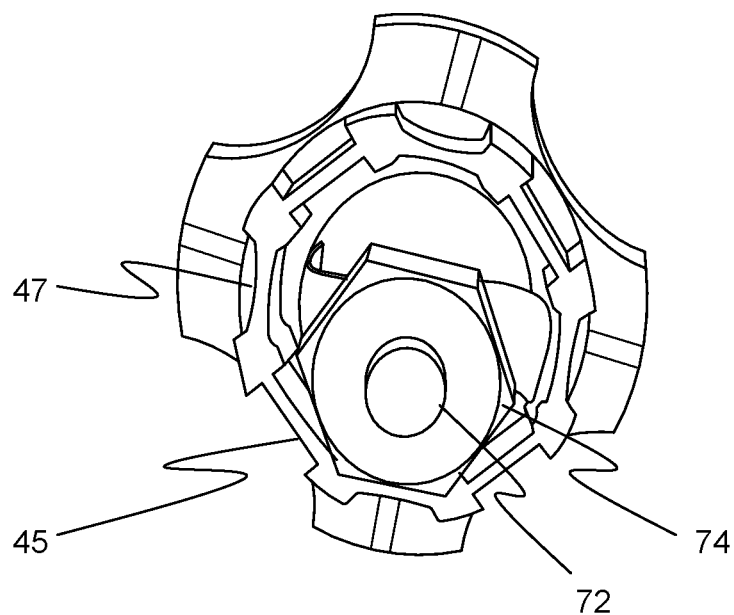
FIG. 12 is a bottom perspective view of FIG. 11B, showing the circumferential wall of the rotatable cap having tab grooves and beveled grooves.

FIGS. 10A and 10B show various views of the embodiment of FIG. 9 where the first tab 55 is received in the first beveled groove 47, and FIG. 12 shows the bottom view of the locking cap 30, the rotatable cap 40, the connecting member 70, and the spring 80 assembled together. FIG. 10B shows the biased switch 50 pushed to get the first tab 55 out of the first tab groove 45.

The first tab 55 is biased toward the rotatable cap 40 by a spring 80. The biased switch 50 is constructed to slide on or along the base 60, and the biased switch 50 does not rotate with respect to the base 60. Accordingly, if the first tab 55 is received in the tab groove 45, the locking cap 30, the rotatable cap 40, the biased switch 50 or the base 60 cannot rotate with each other.

Figure 11A:
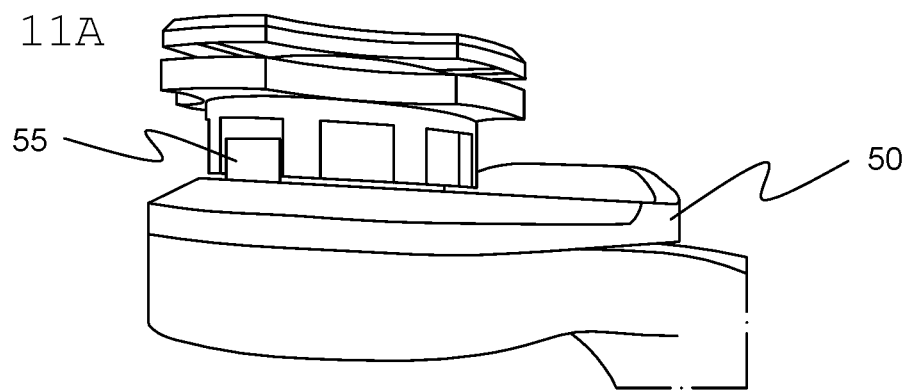
FIG. 11A shows a view of the embodiment of FIG. 9.
Figure 11B:
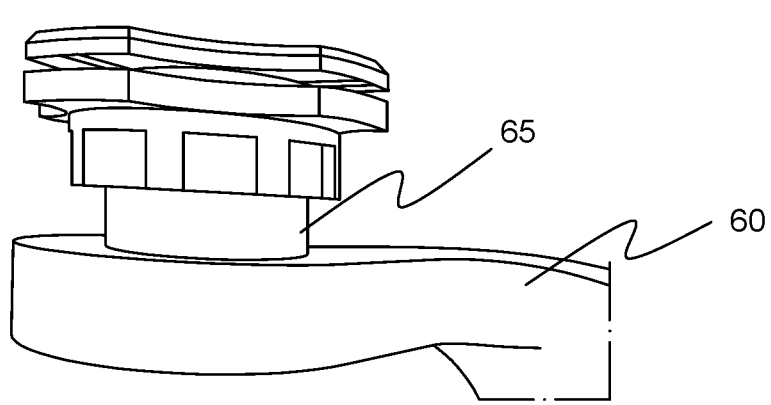
FIG. 11B shows the view of FIG. 11A with the biased switch being removed.
Figure 11C:
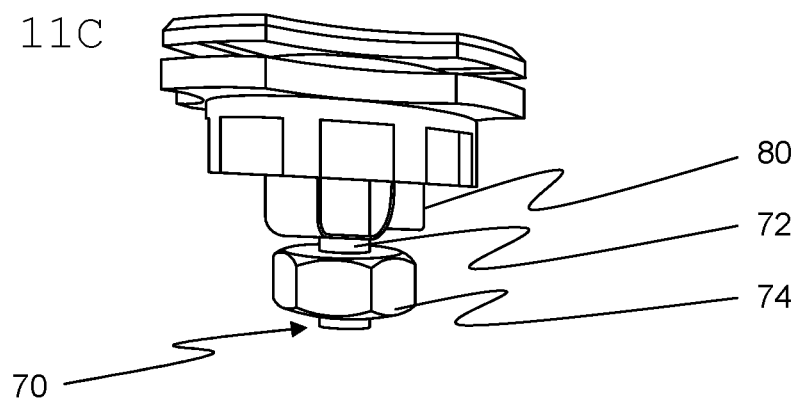
FIG. 11C shows the view of FIG. 11B with the base being removed.
Figure 13:
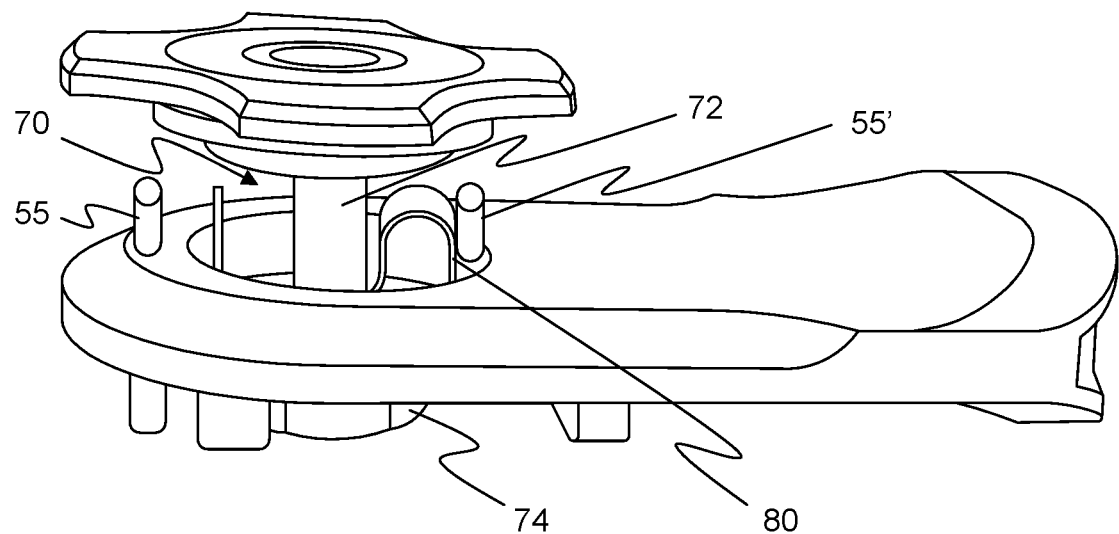
FIG. 13 shows a view of the embodiment of FIG. 9 with the base, rotatable cap, and locking cap being removed.
Figure 14A:
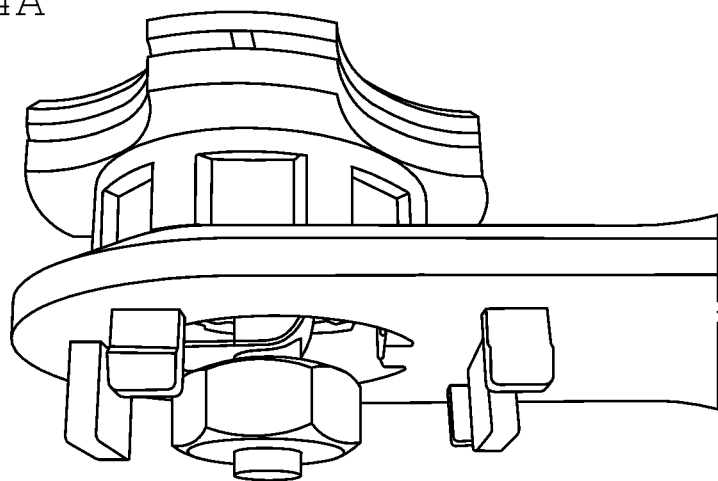
FIG. 14A shows a perspective view of FIG. 9 with the base removed.
Figure 14B:
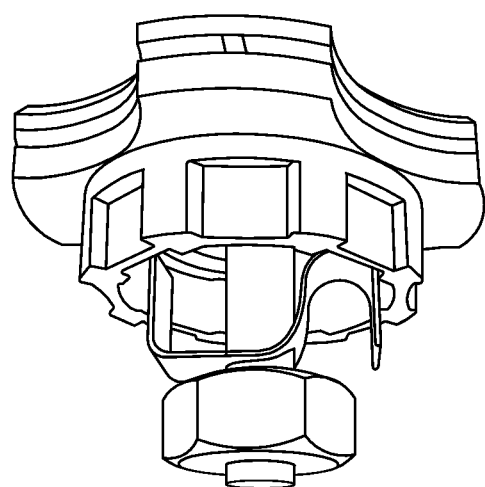
FIG. 14B shows a perspective view of FIG. 9 with the base and biased switch removed.

FIG. 11A shows a view of the embodiment of FIG. 9; FIG. 11B shows the view of FIG. 11A with the biased switch 50 being removed; FIG. 11C shows the view of FIG. 11B with the base 60 being removed; FIG. 12 is a bottom perspective views of 11C, showing the circumferential wall 57 of the rotatable cap 40 having the tab groove 45 and the beveled groove 47 (here, shown as a plurality of tab grooves and a plurality of beveled grooves); FIG. 13 shows a view of the embodiment of FIG. 9 with the base 60 and the rotatable cap 40 removed; and FIGS. 14A and 14B show various perspective views FIG. 9 wherein FIG. 14A shows a perspective view of FIG. 9 with the base 60 removed, and FIG. 14B shows a perspective view of FIG. 9 with the base 60 and biased switch 50 removed.

Preferably, the spring 80 is a compression spring 80, and the biased switch 50 has a second tab 55'. As shown in FIGS. 15 and 16, the compression spring 80 is constructed having an end 82 that is compressed by the second tab 55' in order to move the first tab 55 away from the rotatable cap 40, thus allowing the rotatable cap 40 to rotate. When the spring 80 is at rest, the first tab 55 is biased towards the rotatable cap 40. Alternatively, the compression spring 80 is constructed to be compressed in between the shaft 72 and the second tab 55' in order to bias the first tab 55 toward the rotatable cap 40; the spring 80 is a plate spring 80 having a hole and the shaft passes through the hole as shown in FIG. 14B.

The connecting member 70 may further comprise a nut 74 which is received in a groove of the base 60 to fixedly attach the locking cap 30 to the base 60 as shown in FIG. 11.

The attachment portion 10 has a plurality of protrusions 12 and the plurality of grooves 14, and the protrusions 12 and the grooves 14 are alternately disposed. In addition, the locking cap 30 has the plurality of protrusions 32 and the plurality of grooves 34, and the protrusions 32 and the grooves 34 are alternately disposed. The rotatable cap 40 has the plurality of protrusions 42 and the plurality of grooves 44, and the protrusions 42 and the grooves 44 are alternately disposed.

The mount 20 is removably attachable to the attachment portion 10 via insertion of the protrusions 32 of the locking cap 30 and the protrusions 42 of the rotatable cap 40 into the grooves 14 of the attachment portion 10 and rotation of the attachment portion 10 or the locking cap 30 with respect to each other, and wherein after the insertion, the protrusions 32 of the locking cap 30 are rotatable within the protrusions 12 of the attachment portion 10 whereas the protrusions 42 of the rotatable cap 40 is prevented from rotation by the protrusions 12 of the attachment portion 10. Additionally, the rotatable cap 40 comprises the plurality of tab grooves 45 and the plurality of beveled grooves 47, wherein the tab grooves 45 and the beveled grooves 47 are formed and alternately disposed on an outer-circumferential surface of the rotatable cap 40. Before the insertion, the tab grooves 45 of the rotatable cap 40 are aligned with the grooves 34 of the locking cap 30 whereas after the rotation, the tab grooves 45 of the rotatable cap 40 are aligned with the protrusions 32 of the locking cap 30.

Furthermore, the tab grooves 45 have a depth constructed to receive the first tab 55 of the biased switch 50 and to prevent further rotation of the rotatable cap, and wherein the beveled grooves 47 comprise sloped edges and a depth to receive the first tab 55 of the biased switch 50 and to allow the first tab 55 of the biased switch 50 to move out of the beveled grooves 47 during rotation of the rotatable cap 40. The depth of the tab grooves 45 can be greater than the depth of the beveled grooves 47 to receive the first tab 55 to prevent further rotation of the rotatable cap 40. Alternatively, the depth of the tab grooves 45 may be substantially similar or the same to that of the depth of the beveled groove 47.

In one embodiment, the attachment portion 10 has four protrusions 12 and four grooves 14 wherein the protrusions 12 and the grooves 14 are alternately disposed, and the locking cap 30 has four protrusions 32 and four grooves 34 wherein the protrusions 32 and the grooves 34 are alternately disposed. Furthermore, the rotatable cap 40 has four protrusions 42 and four grooves 44 wherein the protrusions 42 and the grooves 44 are alternately disposed.

Preferably, the attachment portion 10 has four protrusions 12 and four grooves 14, and the protrusions 12 and the grooves 14 are alternately disposed. The locking cap 30 has four protrusions 32 and four grooves 34, and the protrusions 32 and the grooves 34 are alternately disposed. The rotatable cap 40 has four protrusions 42 and four grooves 44, and the protrusions 42 and the grooves 44 are alternately disposed.

The mount 20 is attachable to the attachment portion 10 by inserting the protrusions 32 of the locking cap 30 and the protrusions 42 of the rotatable cap 40 into the grooves 14 of the attachment portion 10 and rotating the attachment portion 10 or the locking cap 30 with respect to each other. After insertion, the protrusions 32 of the locking cap 30 passes the grooves 14 of the attachment portion 10 and the locking cap 30 is rotatable within the attachment portion 10 whereas the protrusions 42 of the rotatable cap 40 fits in the grooves 14 of the attachment portion 10 and the protrusions 12 of the attachment portion prevents rotation of the rotatable cap 40.

Further, before the insertion, the first tab grooves 45 of the rotatable cap 40 are aligned with the grooves 34 of the locking cap 30 whereas after the rotating, the first tab grooves 45 of the rotatable cap 40 are aligned with the protrusions 32 of the locking cap 30.

To unlock or dislodge the mount 20 from the attachment portion 10, the biased switch needs to be pushed to get the first and second tabs 55, 55' out of the first and second tab grooves 45, 45', and then the attachment portion 10 (together with the rotatable cap 40) is rotated with respect to the locking cap 30 in order to align the protrusions 32 of the locking cap 30 with the grooves 14 of the attachment portion 10. Then, the locking cap 30 is removed from the attachment portion 10.

The first tab grooves 45 are formed on the bottom of the rotatable cap 40, and the first tab 55 of the biased switch 50 is constructed to be received in the first tab groove 45 to prevent rotation of the rotatable cap 40.

In addition, the first beveled grooves 47 are formed on the bottom of the rotatable cap 40. The first tab grooves 45 and the beveled grooves 47 are alternately disposed in a circle, and rotation of the rotatable cap 40 pushes the first tab 55 of the biased switch 50 in the first beveled groove 47 away from the rotatable cap 40.

The first tab grooves 45 and the first beveled grooves 47 are formed and alternately disposed on an outer-surface of a circumferential wall 57 of the rotatable cap 40. The first tab 55 of the biased switch 50 is constructed to be received in the first tab groove 45 to prevent rotation of the rotatable cap 40, and rotation of the rotatable cap 40 pushes the first tab 55 of the biased switch 50 in the first beveled groove 47 out of the first beveled groove 47.

Besides, second tab grooves 45' and second beveled grooves 47' are formed and alternately disposed on an inner-surface of the circumferential wall 57 of the rotatable cap 40 as shown in FIG. 12. The second tab 55' of the biased switch 50 is constructed to be received in the second tab groove 45' to prevent rotation of the rotatable cap 40, and rotation of the rotatable cap 40 pushes the second tab 55' of the biased switch 50 in the second beveled groove 47' out of the second beveled groove 47'.

More preferably, there are four first tab grooves 45, four second tab grooves 45', four first beveled grooves 47 and four second beveled grooves 47', and wherein each first and second tab grooves 45, 45' face each other and each first and second beveled grooves 47, 47' face each other.

In another embodiment, as shown in FIGS. 15 and 16, the mount 20 of the apparatus 100 further comprises a cylindrical guide 65 which extends from the base 60, the cylindrical guide 65 comprising at least two locking holes 66 formed on a top surface of the cylindrical guide. Additionally, the locking cap 30 may further comprise at least two locking posts 31 extending from the locking cap 30 such that the locking posts 31 of the locking cap 30 are received in the locking holes 66 of the cylindrical guide 65. Furthermore, the locking cap 30, the rotatable cap 40, and the base are connected to each other via a connecting member 70 with a shaft 72. A connecting hole 67 about the center of the cylindrical guide 65 receives the connecting member 70. Specifically, the shaft 72 passes through holes located about the centers of the locking cap 30 and the rotating cap 40 and then through the connecting hole 67 of the cylindrical guide 65. The connecting hole 67 may be threaded to accommodate the shaft 72 if the latter is complimentary threaded too.

Alternatively, the shaft 72 may couple with a nut 74. As with other embodiments described earlier, the rotatable cap 40 in this embodiment is rotatable with respect to the cylindrical guide 65 as well as the locking cap 30 and the base 60.

As shown FIGS. 15 and 16, the embodiment includes a biased switch 50 comprising a first tab 55 and a second tab 55' wherein the first tab 55 is biased toward the rotatable cap 40 by a spring 80 that is housed in a spring compartment 68 of the cylindrical guide 65. The spring 80, when not compressed, extends the second tab 55' away from the rotatable cap 40 thereby moving the biased switch 50 in a manner that results in the first tab 55 being biased towards the rotating cap 50. By moving the second tab 55' towards the spring 80 (thus, compressing the spring 80), the first tab 55 moves away from the rotatable cap 40, which frees the rotatable cap 40 to rotate. Thus, temporarily, the first tab 55 is not biased towards the rotatable cap 40 when the second tab 55' is moved towards the spring 80. As in other embodiments, the mount 20, as shown in FIGS. 15 and 16 is removably attachable to the attachment portion 10 by inserting the protrusion 32 of the locking cap 30 into the groove 14 of the attachment portion 10 and rotating the attachment portion 10 or the locking cap 30 with respect to each other.

In one embodiment, the attachment portion 10 has a plurality of protrusions 12 and the plurality of grooves 14 wherein the protrusions 12 and the grooves 14 are alternately disposed, and the locking cap 30 has the plurality of protrusions 32 and the plurality of grooves 34 wherein the protrusions 32 and the grooves 34 are alternately disposed. Furthermore, the rotatable cap 40 has the plurality of protrusions 42 and the plurality of grooves 44 wherein the protrusions 42 and the grooves 44 are alternately disposed.

Furthermore, as shown in FIGS. 17A-B and 18A-B, each of the protrusions 12 of the attachment portion 10 has an attachment rib 16 and each of the protrusions 32 of the locking cap 30 has an attachment groove 36, wherein the locking cap 30 has a at least one cap rib 38 and the rotatable cap 40 has at least one cap groove 46 constructed to receive the cap rib 38, wherein the attachment grooves 36 of the locking cap 30 are constructed to receive the attachment ribs 16 of the attachment portion 10 when the protrusions 32 of the locking cap 30 are inserted into the groove 14 of the attachment portion 10 and rotating the attachment portion 10 or the locking cap 30 with respect to each other, resulting in additional control of the rotation.

Alternatively, for further rotational control, each of the protrusions 12 of the attachment portion 10 has an inner surface 11 having an attachment rib 16, wherein each of the protrusions 32 of the locking cap 30 has a bottom surface having an attachment groove 36, wherein the attachment grooves 36 of the locking cap 30 are constructed to receive the attachment ribs 16 of the attachment portion 10 when the protrusions 32 of the locking cap 30 are inserted into the groove 14 of the attachment portion 10 and rotating the attachment portion 10 or the locking cap 30 with respect to each other. Further, the cap rib 38 of the locking cap 30 may protrude from the cylindrical guide 35 of the locking cap 30, the cylindrical guide 35 may extend from an underside of the locking cap 30 as shown in FIG. 18. Alternatively, there may be a plurality of cap ribs 38 distributed equidistant from each other along an edge of the cylindrical guide 35. Preferably, the cap ribs 38, as described above are four in number and are substantially circumferentially arranged 90 degrees from each other. The rotatable cap 40 may include a recess substantially at its center, the recess may include either a single cap groove 46 or a plurality of cap grooves 46 arranged in a manner that corresponds to the cap ribs 38 of the locking cap 30. The number of cap grooves 46 distributed in the recess of the rotatable cap 40 may equal or exceed the number of cap ribs 38 of the locking cap 30.

The mount 20 is removably attachable to the attachment portion 10 via insertion of the protrusions 32 of the locking cap 30 and the protrusions 42 of the rotatable cap 40 into the grooves 14 of the attachment portion 10 and rotation of the attachment portion 10 or the locking cap 30 with respect to each other, and wherein after the insertion, the protrusions 32 of the locking cap 30 are rotatable within the protrusions 12 of the attachment portion 10 whereas the protrusions 42 of the rotatable cap 40 is prevented from rotation by the protrusions 12 of the attachment portion 10. Additionally, the rotatable cap 40 comprises the plurality of tab grooves 45 and the plurality of beveled grooves 47, wherein the tab grooves 45 and the beveled grooves 47 are formed and alternately disposed on an outer-circumferential surface of the rotatable cap 40. Before the insertion, the tab grooves 45 of the rotatable cap 40 are aligned with the grooves 34 of the locking cap 30 whereas after the rotation, the tab grooves 45 of the rotatable cap 40 are aligned with the protrusions 32 of the locking cap 30.

Furthermore, the tab grooves 45 have a depth constructed to receive the first tab 55 of the biased switch 50 and to prevent further rotation of the rotatable cap, and wherein the beveled grooves 47 comprise sloped edges and a depth to receive the first tab 55 of the biased switch 50 and to allow the first tab 55 of the biased switch 50 to move out of the beveled grooves 47 during rotation of the rotatable cap 40. The depth of the tab grooves 45 can be greater than the depth of the beveled grooves 47 to receive the first tab 55 to prevent further rotation of the rotatable cap 40. Alternatively, the depth of the tab grooves 45 may be substantially similar or the same to that of the depth of the beveled groove 47.

In one embodiment, the attachment portion 10 has four protrusions 12 and four grooves 14 wherein the protrusions 12 and the grooves 14 are alternately disposed, and the locking cap 30 has four protrusions 32 and four grooves 34 wherein the protrusions 32 and the grooves 34 are alternately disposed. Furthermore, the rotatable cap 40 has four protrusions 42 and four grooves 44 wherein the protrusions 42 and the grooves 44 are alternately disposed.

In another embodiment, an apparatus 100 for mounting an electronic device comprises an attachment portion 10 that is fixedly attachable to the electronic device. The attachment portion 10 may be attached to the electronic device by a variety of different techniques known in the art such as (but not limited to) temperature-resistant adhesives, permanent mounting tape, acrylic-based adhesives, and the like. The attachment portion 10 includes a groove 14; and a mount 20 constructed to be removably attachable to a vehicle or a bicycle, wherein the mount 20 comprises a locking cap 30 having a protrusion 32; a rotatable cap 40 having a first tab groove 45 wherein the rotatable cap 40 is rotatable with respect to the locking cap 30; and a biased switch 50 comprising a first tab 55 wherein the first tab 55 is biased toward the rotatable cap 40, wherein the mount 20 is attachable to the attachment portion 10 by inserting the protrusion 32 of the locking cap 30 into the groove 14 of the attachment portion 10 and rotating the attachment portion 10 or the locking cap 30 with respect to each other.

In one embodiment, the attachment portion 10 has a plurality of protrusions 12 and the plurality of grooves 14 wherein the protrusions 12 and the grooves 14 are alternately disposed, and the locking cap 30 has the plurality of protrusions 32 and the plurality of grooves 34 wherein the protrusions 32 and the grooves 34 are alternately disposed. Furthermore, the rotatable cap 40 has the plurality of protrusions 42 and the plurality of grooves 44 wherein the protrusions 42 and the grooves 44 are alternately disposed.

Further, as shown in FIGS. 17A-B and 18A-B, each of the protrusions 12 of the attachment portion 10 has an attachment rib 16 and each of the protrusions 32 of the locking cap 30 has an attachment groove 36, wherein the locking cap 30 has a at least one cap rib 38 and the rotatable cap 40 has at least one cap groove 46 constructed to receive the cap rib 38, wherein the attachment grooves 36 of the locking cap 30 are constructed to receive the attachment ribs 16 of the attachment portion 10 when the protrusions 32 of the locking cap 30 are inserted into the groove 14 of the attachment portion 10 and rotating the attachment portion 10 or the locking cap 30 with respect to each other to provide further rotational control.

Alternatively, for further rotational control, each of the protrusions 12 of the attachment portion 10 has an inner surface 11 having an attachment rib 16, wherein each of the protrusions 32 of the locking cap 30 has a bottom surface having an attachment groove 36, wherein the attachment grooves 36 of the locking cap 30 are constructed to receive the attachment ribs 16 of the attachment portion 10 when the protrusions 32 of the locking cap 30 are inserted into the groove 14 of the attachment portion 10 and rotating the attachment portion 10 or the locking cap 30 with respect to each other. Further, the cap rib 38 of the locking cap 30 may protrude from the cylindrical guide 35 of the locking cap 30, the cylindrical guide 35 may extend from an underside of the locking cap 30 as shown in FIG. 18. Alternatively, there may be a plurality of cap ribs 38 distributed equidistant from each other along an edge of the cylindrical guide 35. Preferably, the cap ribs 38, as described above are four in number and are substantially circumferentially arranged 90 degrees from each other. The rotatable cap 40 may include a recess substantially at its center, the recess may include either a single cap groove 46 or a plurality of cap grooves 46 arranged in a manner that corresponds to the cap ribs 38 of the locking cap 30. The number of cap grooves 46 distributed in the recess of the rotatable cap 40 may equal or exceed the number of cap ribs 38 of the locking cap 30.

The mount 20 is removably attachable to the attachment portion 10 via insertion of the protrusions 32 of the locking cap 30 and the protrusions 42 of the rotatable cap 40 into the grooves 14 of the attachment portion 10 and rotation of the attachment portion 10 or the locking cap 30 with respect to each other, and wherein after the insertion, the protrusions 32 of the locking cap 30 are rotatable within the protrusions 12 of the attachment portion 10 whereas the protrusions 42 of the rotatable cap 40 is prevented from rotation by the protrusions 12 of the attachment portion 10. Additionally, the rotatable cap 40 comprises the plurality of tab grooves 45 and the plurality of beveled grooves 47, wherein the tab grooves 45 and the beveled grooves 47 are formed and alternately disposed on an outer-circumferential surface of the rotatable cap 40. Before the insertion, the tab grooves 45 of the rotatable cap 40 are aligned with the grooves 34 of the locking cap 30 whereas after the rotation, the tab grooves 45 of the rotatable cap 40 are aligned with the protrusions 32 of the locking cap 30.

Furthermore, the tab grooves 45 have a depth constructed to receive the first tab 55 of the biased switch 50 and to prevent further rotation of the rotatable cap, and wherein the beveled grooves 47 comprise sloped edges and a depth to receive the first tab 55 of the biased switch 50 and to allow the first tab 55 of the biased switch 50 to move out of the beveled grooves 47 during rotation of the rotatable cap 40. The depth of the tab grooves 45 can be greater than the depth of the beveled grooves 47 to receive the first tab 55 to prevent further rotation of the rotatable cap 40. Alternatively, the depth of the tab grooves 45 may be substantially similar or the same to that of the depth of the beveled groove 47.

In one embodiment, the attachment portion 10 has four protrusions 12 and four grooves 14 wherein the protrusions 12 and the grooves 14 are alternately disposed, and the locking cap 30 has four protrusions 32 and four grooves 34 wherein the protrusions 32 and the grooves 34 are alternately disposed. Furthermore, the rotatable cap 40 has four protrusions 42 and four grooves 44 wherein the protrusions 42 and the grooves 44 are alternately disposed.

In another embodiment, a mount 20 for use along with an attachment portion 10 to form an apparatus 100 for mounting an electronic device wherein the attachment portion 10 is attachable to the electronic device and has a groove 14 and the mount 20 is constructed to removably attachable to a vehicle or a bicycle, the mount 20 comprising: a locking cap 30 having a protrusion 32; a rotatable cap 40 having a tab groove 45 wherein the rotatable cap 40 is rotatable with respect to the locking cap 30; and a biased switch 50 comprising a first tab 55 wherein the first tab 55 is biased toward the rotatable cap 40, wherein the mount 20 is removably attachable to the attachment portion 10 by inserting the protrusion 32 of the locking cap 30 into the groove 14 of the attachment portion 10 and rotating the attachment portion 10 or the locking cap 30 with respect to each other, wherein while rotating the attachment portion 10 or the locking cap 30 with respect to each other, the rotatable cap 40 rotates together with the attachment portion 10 with respect to the locking cap 30, thereby allowing the first tab 55 of the biased switch 50 to be released into the tab groove 45 of the rotatable cap 40 in order to prevent further rotation of the rotatable cap 40 and prevent removal of the locking cap 30 from the attachment portion 10.

The attachment portion 10 can have a plurality of protrusions 12 and the plurality of grooves 14 wherein the protrusions 12 and the grooves 14 are alternately disposed, wherein the locking cap 30 has the plurality of protrusions 32 and the plurality of grooves 34 wherein the protrusions 32 and the grooves 34 are alternately disposed, wherein the rotatable cap 40 has the plurality of protrusions 42 and the plurality of grooves 44 wherein the protrusions 42 and the grooves 44 are alternately disposed, wherein the mount 20 is removably attachable to the attachment portion 10 via insertion of the protrusions 32 of the locking cap 30 and the protrusions 42 of the rotatable cap 40 into the grooves 14 of the attachment portion 10 and rotation of the attachment portion 10 or the locking cap 30 with respect to each other, and wherein after the insertion, the protrusions 32 of the locking cap 30 are rotatable within the protrusions 12 of the attachment portion 10 whereas the protrusions 42 of the rotatable cap 40 is prevented from rotation by the protrusions 12 of the attachment portion 10.

Additionally for the mount 20, the rotatable cap 40 comprises the plurality of tab grooves 45 and the plurality of beveled grooves 47, wherein the tab grooves 45 and the beveled grooves 47 are formed and alternately disposed on an outer-circumferential surface of the rotatable cap 40, and
wherein before the insertion, the tab grooves 45 of the rotatable cap 40 are aligned with the grooves 34 of the locking cap 30 whereas after the rotation, the tab grooves 45 of the rotatable cap 40 are aligned with the protrusions 32 of the locking cap 30.

Further, tab grooves 45 have a depth constructed to receive the first tab 55 of the biased switch 50 and to prevent further rotation of the rotatable cap, and wherein the beveled grooves 47 comprise sloped edges and a depth to receive the first tab 55 of the biased switch 50 and to allow the first tab 55 of the biased switch 50 to move out of the beveled grooves 47 during rotation of the rotatable cap 40. Alternatively, the depth of the tab grooves 45 may be substantially similar or the same to that of the depth of the beveled groove 47.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An apparatus for mounting an electronic device, comprising:
    a case (200) for the electronic device;
    an attachment portion (10), formed on the case (200) or fixedly attached to the case (200), having a groove (14); and
    a mount (20) constructed to be removably attachable to a vehicle or a bicycle,
wherein the mount (20) comprises:
    a locking cap (30) having a protrusion (32);
    a rotatable cap (40) having a tab groove (45) wherein the rotatable cap (40) is rotatable with respect to the locking cap (30); and
    a biased switch (50) comprising a first tab (55) wherein the first tab (55) is biased towards the rotatable cap (40),
    wherein the mount (20) is removably attachable to the attachment portion (10) by inserting the protrusion (32) of the locking cap (30) into the groove (14) of the attachment portion (10) and rotating the attachment portion (10) or the locking cap (30) with respect to each other.

2. The apparatus of claim 1, wherein while rotating the attachment portion (10) or the locking cap (30) with respect to each other, the rotatable cap (40) rotates together with the attachment portion (10) with respect to the locking cap (30), thereby allowing the first tab (55) of the biased switch (50) to be released into the tab groove (45) of the rotatable cap (40) in order to prevent further rotation of the rotatable cap (40) and prevent removal of the locking cap (30) from the attachment portion (10).

3. The apparatus of claim 1, wherein the mount (20) further comprises a base (60) which is fixedly attached to the locking cap (30),
    wherein the rotatable cap (40) is rotatable with respect to the locking cap (30) and the base (60), and
    wherein the base (60) is constructed to be removably attachable to the vehicle or the bicycle.

4. The apparatus of claim 3, wherein the mount (20) further comprises a cylindrical guide (35), (65) which extends from the locking cap (30) or the base (60) or both, and wherein the rotatable cap (40) is rotatable with respect to the cylindrical guide (35), (65) as well as the locking cap (30) and the base (60).

5. The apparatus of claim 4, wherein the base (60) is fixedly attached to the locking cap (30) by a connecting member (70).

6. The apparatus of claim 5, wherein the connecting member (70) comprises a shaft (72) that is received in a guide hole (67) formed about a center of the cylindrical guide (35), (65) and wherein the rotatable cap (40) is rotatable with respect to the shaft (72) as well as the locking cap (30) and the base (60).

7. The apparatus of claim 6, wherein the first tab (55) of the biased switch (50) is biased toward the rotatable cap (40) by a spring (80), and
    wherein the biased switch (50) further comprises a second tab (55') wherein the second tab (55') is positioned against an end (82) of the spring (80) such that directing the second tab (55') towards the end (82) of the spring (80) compresses the spring (80).

8. The apparatus of claim 1, wherein the attachment portion (10) has a plurality of protrusions (12) and the plurality of grooves (14) wherein the protrusions (12) and the grooves (14) are alternately disposed, and
    wherein the locking cap (30) has the plurality of protrusions 32 and the plurality of grooves (34) wherein the protrusions 32 and the grooves (34) are alternately disposed,
    wherein the rotatable cap (40) has the plurality of protrusions (42) and the plurality of grooves (44) wherein the protrusions (42) and the grooves (44) are alternately disposed.

9. The apparatus of claim 8, wherein each of the protrusions (12) of the attachment portion (10) has an attachment rib (16) and each of the protrusions (32) of the locking cap (30) has an attachment groove (36),
    wherein the locking cap (30) has a at least one cap rib (38) and the rotatable cap (40) has at least one cap groove (46) constructed to receive the cap rib (38),
    wherein the attachment grooves (36) of the locking cap (30) are constructed to receive the attachment ribs (16) of the attachment portion (10) when the protrusions (32) of the locking cap (30) are inserted into the groove (14) of the attachment portion (10) and rotating the attachment portion (10) or the locking cap (30) with respect to each other.

10. The apparatus of claim 8, wherein each of the protrusions (12) of the attachment portion (10) has an inner surface (11) having an attachment rib (16),
    wherein each of the protrusions (32) of the locking cap (30) has a bottom surface having an attachment groove (36),
    wherein the attachment grooves (36) of the locking cap (30) are constructed to receive the attachment ribs (16) of the attachment portion (10) when the protrusions (32) of the locking cap (30) are inserted into the groove (14) of the attachment portion (10) and rotating the attachment portion (10) or the locking cap (30) with respect to each other.

11. The apparatus of claim 8, wherein the mount (20) is removably attachable to the attachment portion (10) via insertion of the protrusions (32) of the locking cap (30) and the protrusions (42) of the rotatable cap (40) into the grooves (14) of the attachment portion (10) and rotation of the attachment portion (10) or the locking cap (30) with respect to each other, and
    wherein after the insertion, the protrusions (32) of the locking cap (30) are rotatable within the protrusions (12) of the attachment portion (10) whereas the protrusions (42) of the rotatable cap (40) is prevented from rotation by the protrusions (12) of the attachment portion (10).

12. The apparatus of claim 11, wherein the rotatable cap (40) comprises the plurality of tab grooves (45) and the plurality of beveled grooves (47), wherein the tab grooves

(45) and the beveled grooves (47) are formed and alternately disposed on an outer-circumferential surface of the rotatable cap (40).

13. The apparatus of claim 12, wherein before the insertion, the tab grooves (45) of the rotatable cap (40) are aligned with the grooves (34) of the locking cap (30) whereas after the rotation, the tab grooves (45) of the rotatable cap (40) are aligned with the protrusions (32) of the locking cap (30).

14. The apparatus of claim 13, wherein the tab grooves (45) have a depth constructed to receive the first tab (55) of the biased switch (50) and to prevent further rotation of the rotatable cap, and
wherein the beveled grooves (47) comprise sloped edges and a depth to receive the first tab (55) of the biased switch (50) and to allow the first tab (55) of the biased switch (50) to move out of the beveled grooves (47) during rotation of the rotatable cap (40).

15. The apparatus of claim 14, wherein the depth of the tab grooves (45) is greater than the depth of the beveled grooves (47).

16. An apparatus (100) for mounting an electronic device, comprising:
an attachment portion (10), attachable to the electronic device, having a groove (14); and
a mount (20) constructed to be removably attachable to a vehicle or a bicycle,
wherein the mount (20) comprises:
a locking cap (30) having a protrusion (32);
a rotatable cap (40) having a tab groove (45) wherein the rotatable cap (40) is rotatable with respect to the locking cap (30); and
a biased switch (50) comprising a first tab (55) wherein the first tab (55) is biased toward the rotatable cap (40),
wherein the mount (20) is removably attachable to the attachment portion (10) by inserting the protrusion (32) of the locking cap (30) into the groove (14) of the attachment portion (10) and rotating the attachment portion (10) or the locking cap (30) with respect to each other,
wherein while rotating the attachment portion (10) or the locking cap (30) with respect to each other, the rotatable cap (40) rotates together with the attachment portion (10) with respect to the locking cap (30), thereby allowing the first tab (55) of the biased switch (50) to be released into the tab groove (45) of the rotatable cap (40) in order to prevent further rotation of the rotatable cap (40) and prevent removal of the locking cap (30) from the attachment portion (10).

17. The apparatus (100) of claim 16, wherein the mount (20) further comprises a base (60) which is fixedly attached to the locking cap (30),
wherein the rotatable cap (40) is rotatable with respect to the locking cap (30) and the base (60),
wherein the base (60) is constructed to be removably attachable to the vehicle or the bicycle, and
wherein the mount (20) further comprises a cylindrical guide (35), (65) which extends from the locking cap (30) or the base (60) or both, and wherein the rotatable cap (40) is rotatable with respect to the cylindrical guide (35), (65) as well as the locking cap (30) and the base (60).

18. The apparatus (100) of claim 17, wherein the base (60) is fixedly attached to the locking cap (30) by a connecting member (70),
wherein the connecting member (70) comprises a shaft (72) that is received in a guide hole (67) formed about a center of the cylindrical guide (35), (65) and wherein the rotatable cap (40) is rotatable with respect to the shaft (72) as well as the locking cap (30) and the base (60).

19. The apparatus (100) of claim 16, wherein the attachment portion (10) has a plurality of protrusions (12) and the plurality of grooves (14) wherein the protrusions (12) and the grooves (14) are alternately disposed,
wherein the locking cap (30) has the plurality of protrusions (32) and the plurality of grooves (34) wherein the protrusions (32) and the grooves (34) are alternately disposed,
wherein the rotatable cap (40) has the plurality of protrusions (42) and the plurality of grooves (44) wherein the protrusions (42) and the grooves (44) are alternately disposed,
wherein the mount (20) is removably attachable to the attachment portion (10) via insertion of the protrusions (32) of the locking cap (30) and the protrusions (42) of the rotatable cap (40) into the grooves (14) of the attachment portion (10) and rotation of the attachment portion (10) or the locking cap (30) with respect to each other, and
wherein after the insertion, the protrusions (32) of the locking cap (30) are rotatable within the protrusions (12) of the attachment portion (10) whereas the protrusions (42) of the rotatable cap (40) is prevented from rotation by the protrusions (12) of the attachment portion (10).

20. The apparatus (100) of claim 19, wherein each of the protrusions (12) of the attachment portion (10) has an attachment rib (16) and each of the protrusions (32) of the locking cap (30) has an attachment groove (36),
wherein the locking cap (30) has a at least one cap rib (38) and the rotatable cap (40) has at least one cap groove (46) constructed to receive the cap rib (38),
wherein the attachment grooves (36) of the locking cap (30) are constructed to receive the attachment ribs (16) of the attachment portion (10) when the protrusions (32) of the locking cap (30) are inserted into the groove (14) of the attachment portion (10) and rotating the attachment portion (10) or the locking cap (30) with respect to each other.

21. The apparatus (100) of claim 19, wherein each of the protrusions (12) of the attachment portion (10) has an inner surface (11) having an attachment rib (16),
wherein each of the protrusions (32) of the locking cap (30) has a bottom surface having an attachment groove (36),
wherein the attachment grooves (36) of the locking cap (30) are constructed to receive the attachment ribs (16) of the attachment portion (10) when the protrusions (32) of the locking cap (30) are inserted into the groove (14) of the attachment portion (10) and rotating the attachment portion (10) or the locking cap (30) with respect to each other.

22. The apparatus (100) of claim 19, wherein the rotatable cap (40) comprises the plurality of tab grooves (45) and the plurality of beveled grooves (47), wherein the tab grooves (45) and the beveled grooves (47) are formed and alternately disposed on an outer-circumferential surface of the rotatable cap (40), and
wherein before the insertion, the tab grooves (45) of the rotatable cap (40) are aligned with the grooves (34) of the locking cap (30) whereas after the rotation, the tab grooves (45) of the rotatable cap (40) are aligned with the protrusions (32) of the locking cap (30).

23. The apparatus (100) of claim 22, wherein the tab grooves (45) have a depth constructed to receive the first tab (55) of the biased switch (50) and to prevent further rotation of the rotatable cap, and
  wherein the beveled grooves (47) comprise sloped edges and a depth to receive the first tab (55) of the biased switch (50) and to allow the first tab (55) of the biased switch (50) to move out of the beveled grooves (47) during rotation of the rotatable cap (40).

24. The apparatus (100) of claim 23, wherein the depth of the tab grooves (45) is greater than the depth of the beveled grooves (47).

25. A mount (20) for use along with an attachment portion (10) to form an apparatus (100) for mounting an electronic device wherein the attachment portion (10) is attachable to the electronic device and has a groove (14) and the mount (20) is constructed to removably attachable to a vehicle or a bicycle, the mount (20) comprising:
  a locking cap (30) having a protrusion (32);
  a rotatable cap (40) having a tab groove (45) wherein the rotatable cap (40) is rotatable with respect to the locking cap (30); and
  a biased switch (50) comprising a first tab (55) wherein the first tab (55) is biased toward the rotatable cap (40),
  wherein the mount (20) is removably attachable to the attachment portion (10) by inserting the protrusion (32) of the locking cap (30) into the groove (14) of the attachment portion (10) and rotating the attachment portion (10) or the locking cap (30) with respect to each other,
  wherein while rotating the attachment portion (10) or the locking cap (30) with respect to each other, the rotatable cap (40) rotates together with the attachment portion (10) with respect to the locking cap (30), thereby allowing the first tab (55) of the biased switch (50) to be released into the tab groove (45) of the rotatable cap (40) in order to prevent further rotation of the rotatable cap (40) and prevent removal of the locking cap (30) from the attachment portion (10).

26. The mount (20) of claim 25, wherein the attachment portion (10) has a plurality of protrusions (12) and the plurality of grooves (14) wherein the protrusions (12) and the grooves (14) are alternately disposed,
  wherein the locking cap (30) has the plurality of protrusions (32) and the plurality of grooves (34) wherein the protrusions (32) and the grooves (34) are alternately disposed,
  wherein the rotatable cap (40) has the plurality of protrusions (42) and the plurality of grooves (44) wherein the protrusions (42) and the grooves (44) are alternately disposed,
  wherein the mount (20) is removably attachable to the attachment portion (10) via insertion of the protrusions (32) of the locking cap (30) and the protrusions (42) of the rotatable cap (40) into the grooves (14) of the attachment portion (10) and rotation of the attachment portion (10) or the locking cap (30) with respect to each other, and
  wherein after the insertion, the protrusions (32) of the locking cap (30) are rotatable within the protrusions (12) of the attachment portion (10) whereas the protrusions (42) of the rotatable cap (40) is prevented from rotation by the protrusions (12) of the attachment portion (10).

27. The mount (20) of claim 26, wherein the rotatable cap (40) comprises the plurality of tab grooves (45) and the plurality of beveled grooves (47), wherein the tab grooves (45) and the beveled grooves (47) are formed and alternately disposed on an outer-circumferential surface of the rotatable cap (40), and
  wherein before the insertion, the tab grooves (45) of the rotatable cap (40) are aligned with the grooves (34) of the locking cap (30) whereas after the rotation, the tab grooves (45) of the rotatable cap (40) are aligned with the protrusions (32) of the locking cap (30).

28. The mount (20) of claim 27, wherein the tab grooves (45) have a depth constructed to receive the first tab (55) of the biased switch (50) and to prevent further rotation of the rotatable cap, and
  wherein the beveled grooves (47) comprise sloped edges and a depth to receive the first tab (55) of the biased switch (50) and to allow the first tab (55) of the biased switch (50) to move out of the beveled grooves (47) during rotation of the rotatable cap (40).

* * * * *